US012428972B2

(12) United States Patent
Khamkar et al.

(10) Patent No.: US 12,428,972 B2
(45) Date of Patent: Sep. 30, 2025

(54) SYSTEM AND METHOD FOR HYDRAULICALLY ACTUATING MAIN AND BYPASS VALVES OF A STEAM TURBINE

(71) Applicant: General Electric Company, Schenectady, NY (US)

(72) Inventors: Amit Laxmanrao Khamkar, Uttar Pradesh (IN); Arshad Amin Ansari, Uttar Pradesh (IN); Shaurabh Banerjee, New Delhi (IN)

(73) Assignee: GE Infrastructure Technology LLC, Greenville, SC (US)

( * ) Notice: Subject to any disclaimer, the term of this patent is extended or adjusted under 35 U.S.C. 154(b) by 263 days.

(21) Appl. No.: 17/877,792

(22) Filed: Jul. 29, 2022

(65) Prior Publication Data

US 2023/0383672 A1 Nov. 30, 2023

(30) Foreign Application Priority Data

May 26, 2022 (IN) ............................. 202211030308

(51) Int. Cl.
*F01D 17/10* (2006.01)

(52) U.S. Cl.
CPC ........ *F01D 17/105* (2013.01); *F05D 2220/31* (2013.01); *F05D 2260/606* (2013.01)

(58) Field of Classification Search
CPC ............... F01D 17/105; F05D 2220/31; F05D 2220/32; F05D 2270/64
See application file for complete search history.

(56) References Cited

U.S. PATENT DOCUMENTS

| | | | | |
|---|---|---|---|---|
| 4,294,284 | A * | 10/1981 | Herd | F16K 3/0254 251/327 |
| 4,589,444 | A * | 5/1986 | Masek | F01D 17/26 91/437 |
| 5,133,189 | A | 7/1992 | Hurley | |
| 5,269,141 | A * | 12/1993 | Burch | F16L 55/1022 251/25 |
| 10,605,116 | B2 | 3/2020 | Futahashi et al. | |

(Continued)

FOREIGN PATENT DOCUMENTS

| | | | |
|---|---|---|---|
| EP | 1881164 | A1 | 1/2008 |
| EP | 2960443 | A1 | 12/2015 |

(Continued)

OTHER PUBLICATIONS

WO-2023198987-A1 machine translation (Year: 2023).*
Extended European Search Report of EP Application No. 23173090.4 dated Jan. 15, 2024, 6 pgs.

*Primary Examiner* — Matthew Wiblin
(74) *Attorney, Agent, or Firm* — Fletcher Yoder, P.C.

(57) ABSTRACT

A system includes a hydraulic power unit having a tank, a pump assembly, an accumulator assembly, and a header. The tank is configured to store a common hydraulic fluid. The pump assembly is configured to pump the common hydraulic fluid from the tank to provide a pressurized hydraulic fluid. The accumulator assembly is configured to store the pressurized hydraulic fluid. The header is coupled to the pump assembly and the accumulator assembly, wherein the header is configured to supply the pressurized hydraulic fluid to one or more main valves and one or more bypass valves of a steam turbine system.

22 Claims, 6 Drawing Sheets

(56) References Cited

U.S. PATENT DOCUMENTS

| | | | | |
|---|---|---|---|---|
| 2009/0235631 | A1* | 9/2009 | Bocquet | F02C 7/232 60/734 |
| 2012/0118809 | A1* | 5/2012 | Bauer | B01D 29/11 210/263 |
| 2015/0108249 | A1* | 4/2015 | James | F02K 1/763 60/579 |
| 2021/0033025 | A1* | 2/2021 | Abdurrahman | F01D 25/12 |
| 2022/0136436 | A1* | 5/2022 | Cha | F01K 11/02 290/2 |

FOREIGN PATENT DOCUMENTS

| | | | | |
|---|---|---|---|---|
| EP | 3219939 | A1 | 9/2017 | |
| KR | 20170031180 | A | 3/2017 | |
| WO | 2011030285 | A1 | 3/2011 | |
| WO | 2016157116 | A1 | 10/2016 | |
| WO | WO-2023198987 | A1 * | 10/2023 | B64C 11/38 |

* cited by examiner

SYSTEM AND METHOD FOR HYDRAULICALLY ACTUATING MAIN AND BYPASS VALVES OF A STEAM TURBINE

CROSS-REFERENCE TO RELATED APPLICATION

This application claims priority to and benefit of Indian Application No. 202211030308, filed on May 26, 2022; entitled "SYSTEM AND METHOD FOR HYDRAULICALLY ACTUATING MAIN AND BYPASS VALVES OF A STEAM TURBINE", which is herein incorporated by reference in its entirety.

BACKGROUND

The subject matter disclosed herein relates to a steam turbine system and, more particularly, to systems for hydraulically actuating main and bypass valves of the steam turbine system.

A steam turbine system uses steam to drive one or more steam turbines. A main supply line having a main valve is configured to control a steam supply to each steam turbine, whereas a bypass line having a bypass valve is configured to bypass the steam supply to a cold reheat and/or a condenser. In operation, a main actuation system controls the main valves, whereas a separate bypass actuation system controls the bypass valves. The main and bypass actuation systems may differ from one another in a variety of ways, such as different components, different actuation fluids, different capacities, different specifications, or any combination thereof. Unfortunately, the two actuation systems (e.g., main and bypass actuation systems) add considerable costs for the initial purchase and installation, maintenance, and subsequent repairs or replacements. Additionally, the two actuation systems consume significant space at a site and may require equipment from different vendors, including different control systems or controls software. A need exists for an actuation system capable of operating both main valves and bypass valves to help reduce the foregoing disadvantages.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In certain embodiments, a system includes a hydraulic power unit having a tank, a pump assembly, and a header. The tank is configured to store a common hydraulic fluid. The pump assembly is configured to pump the common hydraulic fluid from the tank to provide a pressurized hydraulic fluid. An accumulator assembly is configured to store the pressurized hydraulic fluid. The header is coupled to the pump assembly and the accumulator assembly, wherein the header is configured to supply the pressurized hydraulic fluid to one or more main valves and one or more bypass valves of a steam turbine system.

In certain embodiments, a system includes a steam turbine, a main control system, a bypass control system, and a hydraulic power unit coupled to the main control system and the bypass control system. The main control system has one or more main valves coupled to the steam turbine. The bypass control system has one or more bypass valves coupled to the steam turbine. The hydraulic power unit is configured to supply a common hydraulic fluid at a pressure sufficient to operate the one or more main valves and the one or more bypass valves.

In certain embodiments, a method includes storing a common hydraulic fluid in a tank of a hydraulic power unit, pumping the common hydraulic fluid from the tank via a pump assembly of the hydraulic power unit to provide a pressurized hydraulic fluid, and storing the pressurized hydraulic fluid via an accumulator assembly of the hydraulic power unit. The method also includes supplying the pressurized hydraulic fluid to one or more main valves and one or more bypass valves of a steam turbine system via a header of the hydraulic power unit, wherein the header is coupled to the pump assembly and the accumulator assembly.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
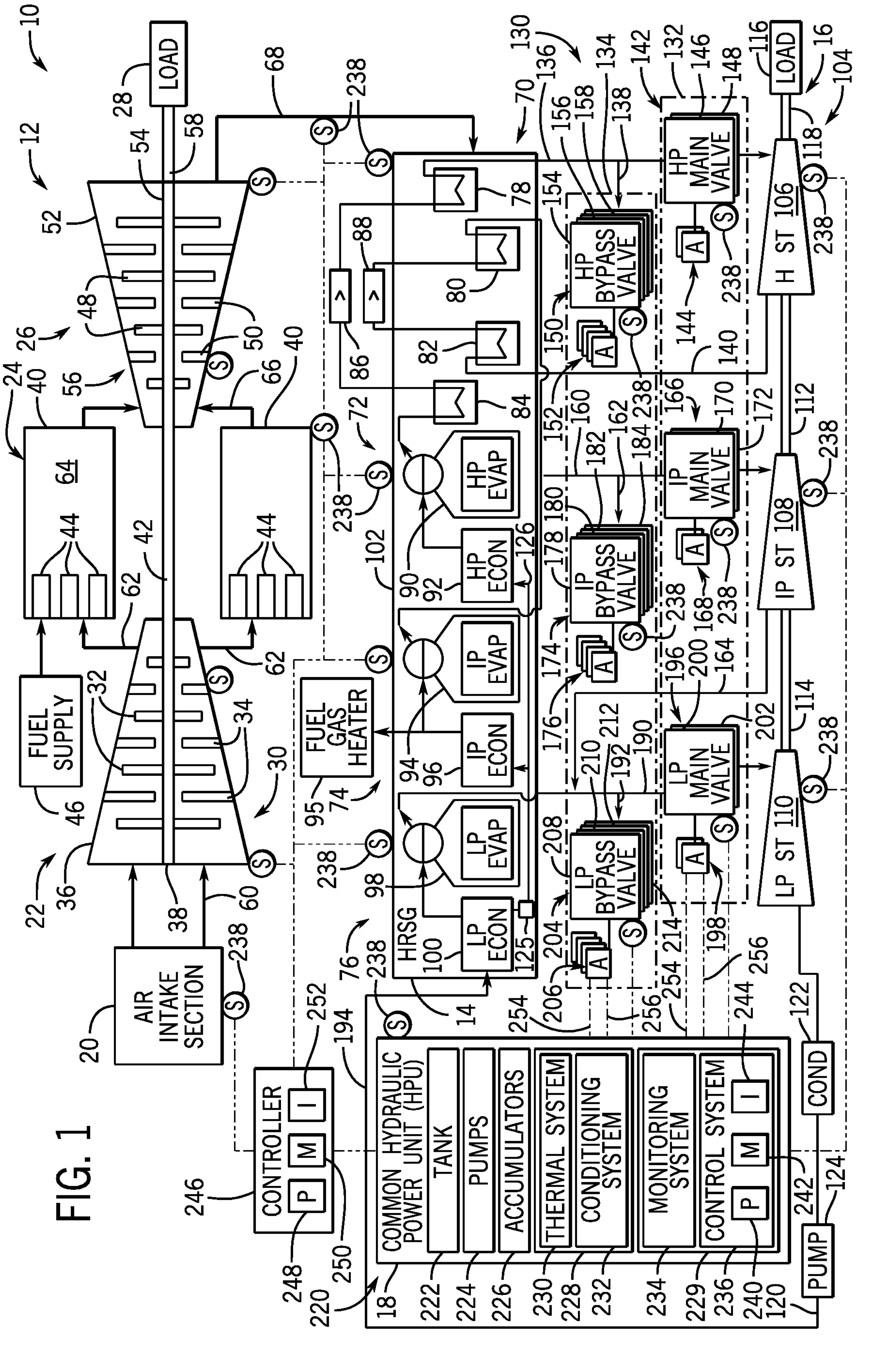
FIG. 1 is a schematic view of an embodiment of a combined cycle power plant having a gas turbine system, a heat recovery steam generator (HRSG), a steam turbine system, and a common hydraulic power unit (HPU) coupled to a fluid control system to operate both main valves and bypass valves of the steam turbine system.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

In certain embodiments as discussed below, a common hydraulic power unit (HPU) is configured to operate both main valves and bypass valves of a steam turbine system. The common HPU has equipment with specifications suitable for both the main valves and the bypass valves. For example, the components of the common HPU generally have specifications meeting the greater requirements of either the main valves or the bypass valves, such that specifications may substantially exceed the requirements of one of the main valves or the bypass valves. The common HPU helps to reduce the costs and space consumption of the components used to actuate the main valves and the bypass valves, particularly by sharing the components (e.g., hydraulic tanks, hydraulic pumps, hydraulic accumulators, hydraulic filters and conditioning equipment, hydraulic heating and cooling equipment, monitoring equipment (e.g., sensors), and the control system). The common HPU also helps to simplify maintenance, because only the one common HPU will undergo inspections, repairs, and replacements of the various components. The common HPU also provides substantial improvements by sharing the components, which may be substantial upgrades over components previously used for either of the main valves or the bypass valves in separate actuation systems. The following discussion presents the common HPU in context of a combined cycle power plant; however, the common HPU may be used in any hydraulically controlled system having both main valves and bypass valves. Each of the components and features described in the drawings is intended for use in various combinations with one another.

FIG. 1 is a schematic of an embodiment of a combined cycle power plant 10 having a gas turbine system 12, a heat recovery steam generator (HRSG) 14, a steam turbine system 16, and a common hydraulic power unit (HPU) 18. The gas turbine system 12 cycle is often referred to as the "topping cycle," whereas the steam turbine system 16 cycle is often referred to as the "bottoming cycle." By combining these two cycles as illustrated in FIG. 1, the combined cycle power plant 10 may lead to greater efficiencies in both cycles. In particular, exhaust heat from the topping cycle may be captured and used to generate steam in the HRSG 14 for use in the bottoming cycle. However, the HRSG 14 may be configured to generate and supply steam for other uses in the combined cycle power plant 10. The common HPU 18 has a plurality of components, monitoring functions, and control functions shared between main and bypass fluid control systems of the steam turbine system 16. In particular, the common HPU 18 generally eliminates the use of completely separate actuation systems (e.g., hydraulic power units) for the main and bypass fluid control systems. The specific features and operating characteristics of the common HPU 18 are discussed in further detail below.

As illustrated, the gas turbine system 12 includes an air intake section 20, a compressor section 22, a combustor section 24, a turbine section 26, and a load 28, such as an electrical generator. The air intake section 20 may include one or more air filters, anti-icing systems, fluid injection systems (e.g., temperature control fluids), silencer baffles, or any combination thereof. The compressor section 22 includes multiple compressor stages 30, each having multiple rotating compressor blades 32 coupled to a compressor shaft 38 and multiple stationary compressor vanes 34 coupled to a compressor casing 36. The combustor section 24 includes one or more combustors 40. A shaft 42 extends between the compressor section 22 and the turbine section 26. Each combustor 40 includes one or more fuel nozzles 44 coupled to one or more fuel supplies 46, which may supply fuel through primary and secondary fuel circuits. The fuel supplies 46 may supply natural gas, syngas, biofuel, fuel oils, or any combination of liquid and gas fuels. The turbine section 26 includes multiple turbine stages 56, each having multiple rotating turbine blades 48 coupled to a turbine shaft 54 and multiple stationary turbine vanes 50 coupled to a turbine casing 52. The turbine shaft 54 also connects to the load 28 via a shaft 58.

In operation, the gas turbine system 12 routes an air intake flow 60 from the air intake section 20 into the compressor section 22. The compressor section 22 progressively compresses the air intake flow 60 in the stages 30 and delivers a compressed airflow 62 into the one or more combustors 40. The one or more combustors 40 receive fuel from the fuel supply 46, route the fuel through the fuel nozzles 44, and combust the fuel with the compressed airflow 62 to generate hot combustion gases in a combustion chamber 64 within the combustor 40. The one or more combustors 40 then route a hot combustion gas flow 66 into the turbine section 26. The turbine section 26 progressively expands the hot combustion gas flow 66 and drives rotation of the turbine blades 48 in the stages 56 before discharging an exhaust gas flow 68. As the hot combustion gas flow 66 drives rotation of the turbine blades 48, the turbine blades 48 drive rotation of the turbine shaft 54, the shafts 42 and 58, and the compressor shaft 38. Accordingly, the turbine section 26 drives rotation of the compressor section 22 and the load 28. The exhaust gas flow 68 may be partially or entirely directed to flow through the HRSG 14 to enable heat recovery and steam generation.

The HRSG 14 may include a plurality of heat exchangers and/or heat exchange components 70 disposed in different sections, such as a high pressure (HP) section 72, an intermediate pressure (IP) section 74, and a low pressure (LP) section 76. The components 70 may include economizers, evaporators, superheaters, or any combination thereof, in each of the HP, IP, and LP sections 72, 74, and 76. The components 70 may be coupled together via various conduits and headers, and the HRSG 14 may route one or more flows of steam (e.g., low pressure steam, intermediate pressure steam, and high pressure steam) to the steam turbine system 16. In the illustrated embodiment, the components 70 of the HRSG 14 include a finishing high pressure superheater 78, a secondary re-heater 80, a primary re-heater 82, a primary high pressure superheater 84, an inter-stage attemperator 86, an inter-stage attemperator 88, a high pressure evaporator 90 (HP EVAP), a high pressure economizer 92 (HP ECON), an intermediate pressure evaporator 94 (IP EVAP), an intermediate pressure economizer 96 (IP ECON), a low pressure evaporator 98 (LP EVAP), and a low pressure economizer 100 (LP ECON). The HRSG 14 also includes an enclosure or duct 102 housing the various components 70. The functionality of the components 70 is discussed in further detail below.

The steam turbine system 16 includes a steam turbine 104 having a high pressure steam turbine (HP ST) 106, an intermediate pressure steam turbine (IP ST) 108, and a low pressure steam turbine (LP ST) 110, which are coupled together via shafts 112 and 114. Additionally, the steam turbine 104 may be coupled to a load 116 via a shaft 118.

Similar to the load 28, the load 116 may include an electrical generator. The HRSG 14 may be configured to generate a high pressure steam for the high pressure steam turbine 106, an intermediate pressure steam for the intermediate pressure steam turbine 108, and a low pressure steam for the low pressure steam turbine 110. In certain embodiments, an exhaust from the high pressure steam turbine 106 may be routed into the intermediate pressure steam turbine 108 through the primary re-heater 82, the inter-stage attemperator 88, and the secondary re-heater 80 within the HRSG 14, and an exhaust from the intermediate pressure steam turbine 108 may be routed into the low pressure steam turbine 110. The steam turbine 104 may discharge a condensate 120 (or the steam may be condensed in a condenser 122 downstream from the steam turbine 104), such that the condensate 120 can be pumped back into the HRSG 14 via one or more pumps 124.

In operation, the exhaust gas flow 68 passes through the HRSG 14 and transfers heat to the components 70 to generate steam for driving the steam turbine 104. The exhaust steam from the low pressure steam turbine 110 may be directed into the condenser 122 to form the condensate 120. The condensate 120 from the condenser 122 may, in turn, be directed into the low pressure section 76 of the HRSG 14 with the aid of the pump 124. The condensate 120 may then flow through the low pressure economizer 100, which is configured to heat a feedwater 126 (including the condensate 120) with the exhaust gas flow 68. From the low pressure economizer 100, the feedwater 126 may flow into the low pressure evaporator 98. The feedwater 126 from low pressure economizer 100 may be directed toward the intermediate pressure economizer 96 and the high pressure economizer 92 with the aid of a pump 125. Steam from the low pressure evaporator 98 may be directed to the low pressure steam turbine 110. Likewise, from the intermediate pressure economizer 96, the feedwater 126 may be routed into the intermediate pressure evaporator 94 and/or toward the high pressure economizer 92. In addition, steam from the intermediate pressure economizer 96 may be routed to a fuel gas heater 95, where the steam may be used to heat fuel gas for use in the combustion chamber 64 of the gas turbine system 12. Steam from the intermediate pressure evaporator 94 may be routed to the intermediate steam turbine 108.

The feedwater 126 from the high pressure economizer 92 may be routed into the high pressure evaporator 90. Steam from the high pressure evaporator 90 may be routed into the primary high pressure superheater 84 and the finishing high pressure superheater 78, where the steam is superheated and eventually routed to the high pressure steam turbine 106. The inter-stage attemperator 86 may be located in between the primary high pressure superheater 84 and the finishing high pressure superheater 78. The inter-stage attemperator 86 may enable more robust control of the exhaust temperature of steam from the finishing high pressure superheater 78. Specifically, the inter-stage attemperator 86 may be configured to control the temperature of steam exiting the finishing high pressure superheater 78 by injecting a cooler feedwater spray into the superheated steam upstream of the finishing high pressure superheater 78 whenever the exhaust temperature of the steam exiting the finishing high pressure superheater 78 exceeds a predetermined value.

In addition, an exhaust from the high pressure steam turbine 106 may be directed into the primary re-heater 82 and the secondary re-heater 80, where it may be re-heated before being directed into the intermediate pressure steam turbine 108. The primary re-heater 82 and the secondary re-heater 80 may also be associated with the inter-stage attemperator 88, which is configured to control the exhaust steam temperature from the re-heaters. Specifically, the inter-stage attemperator 88 may be configured to control the temperature of steam exiting the secondary re-heater 80 by injecting cooler feedwater spray into the superheated steam upstream of the secondary re-heater 80 whenever the exhaust temperature of the steam exiting the secondary re-heater 80 exceeds a predetermined value. The arrangement of the components 70 of the HRSG 14 is merely one possible example for use with the common HPU 18, and the components 70 may be arranged differently within the scope of the present disclosure.

The steam turbine system 16 further includes a fluid control system 130 having a main control system 132 and a bypass control system 134 coupled to the common HPU 18. As illustrated, the fluid control system 130 includes a high pressure steam supply line or conduit 136 coupled to the finishing high pressure superheater 78 and an inlet into the high pressure steam turbine 106, a high pressure bypass line or conduit 138 coupled to the high pressure steam supply line 136, and a discharge or return line 140 coupled to an outlet of the high pressure steam turbine 106 and the primary re-heater 82. The high pressure steam supply line 136 includes one or more high pressure main valves 142, each driven or actuated by an independent hydraulic actuator 144 to move between open and closed positions.

Figure 2:
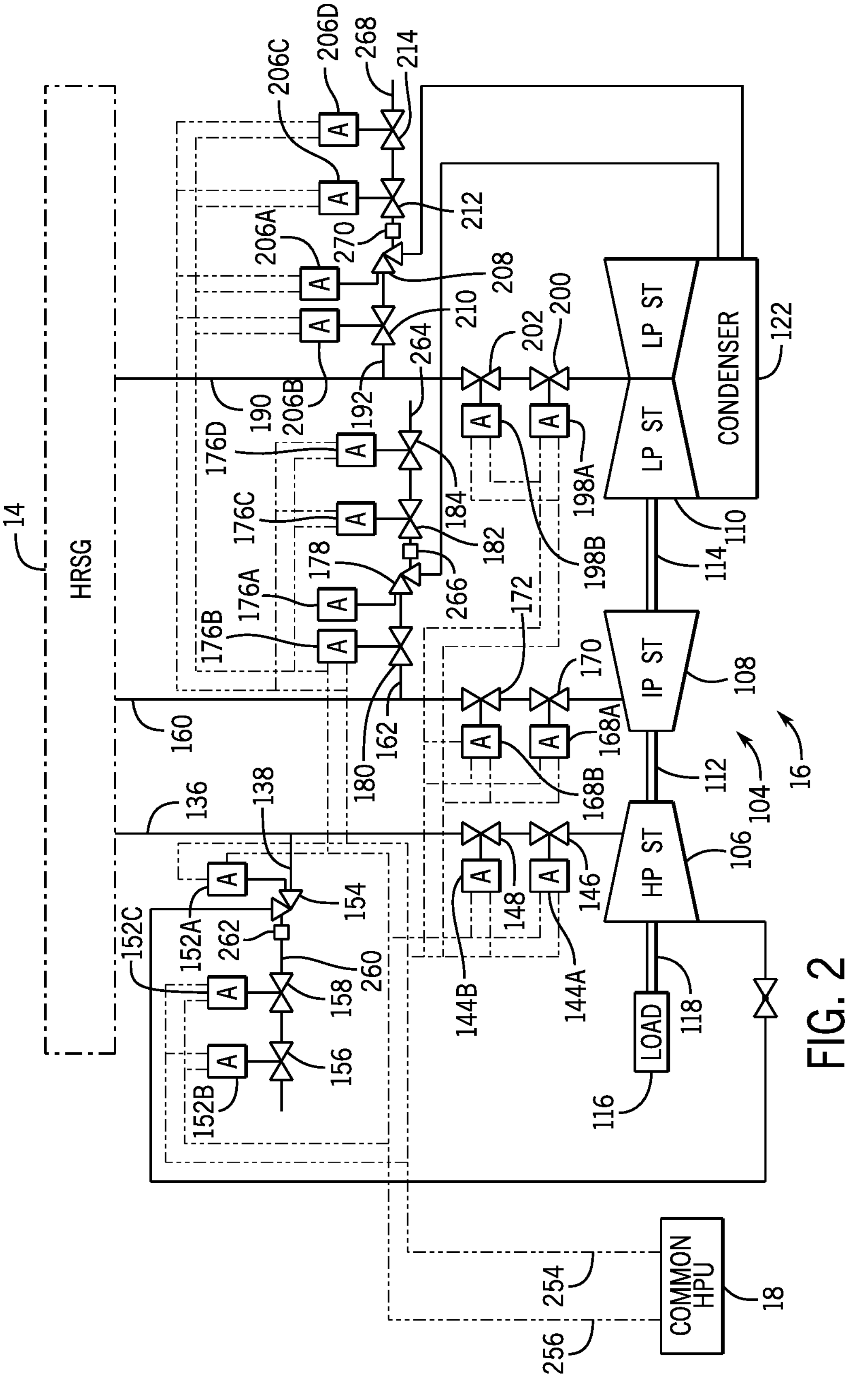
FIG. 2 is a schematic of an embodiment of the steam turbine system and the fluid control system coupled to the HRSG and the common HPU of FIG. 1, further illustrating details of a main control system and a bypass control system of the fluid control system.

For example, as shown in FIG. 2, the high pressure main valves 142 may include a high pressure main steam control valve 146 (e.g., HP main control valve) and a high pressure main steam stop valve 148 (e.g., HP main stop valve). The HP main control valve 146 is actuated by one of the hydraulic actuators 144 (e.g., actuator 144A) to adjust (e.g., increase or decrease) a flow of the high pressure steam into the high pressure steam turbine 106, and the HP main stop valve 148 is actuated by one of the hydraulic actuators 144 (e.g., actuator 144B) to enable or disable (e.g., stop) the flow of the high pressure steam into the high pressure steam turbine 106.

The high pressure bypass line 138 includes one or more high pressure bypass valves 150, each driven or actuated by an independent hydraulic actuator 152 to move between open and closed positions. For example, the high pressure bypass valves 150 may include a high pressure bypass pressure control valve 154 (e.g., HP bypass control valve), a high pressure bypass spray water isolation valve 156 (e.g., HP bypass spray isolation valve), and a high pressure bypass spray water control valve 158 (e.g., HP bypass spray control valve). The HP bypass control valve 154 is actuated by one of the hydraulic actuators 152 (e.g., actuator 152A) to adjust (e.g., increase or decrease) a pressure of the high pressure bypass flow being diverted away from the HP steam supply line 136. The HP bypass spray isolation valve 156 is actuated by one of the hydraulic actuators 152 (e.g., actuator 152B) to enable or disable (e.g., stop) the flow of a water spray configured to attemperate the high pressure bypass flow prior to return to the HRSG 14. The HP bypass spray control valve 158 is actuated by one of the hydraulic actuators 152 (e.g., actuator 152C) to adjust (e.g., increase or decrease) the flow of the water spray configured to attemperate the high pressure bypass flow prior to return to the HRSG 14. In certain embodiments, the water used for the water spray is delivered from the feedwater 126 or another source of water in the HRSG 14.

As further illustrated in FIG. 1, the fluid control system 130 includes an intermediate pressure steam supply line or conduit 160, an intermediate pressure bypass line or conduit 162, and a discharge or return line 164. The intermediate pressure steam supply line or conduit 160 is fluidly coupled to outlets of the intermediate pressure evaporator 94 and the secondary re-heater 80 and an inlet into the intermediate pressure steam turbine 108. The intermediate pressure bypass line or conduit 162 is fluidly coupled to the intermediate pressure steam supply line 160. The discharge or return line 164 is fluidly coupled to an outlet of the intermediate pressure steam turbine 108 and an inlet into the low pressure steam turbine 110. The intermediate pressure steam supply line 160 includes one or more intermediate pressure main valves 166, each driven or actuated by an independent hydraulic actuator 168 to move between open and closed positions.

For example, as shown in FIG. 2, the intermediate pressure main valves 166 may include an intermediate pressure main steam control valve 170 (e.g., IP main control valve) and an intermediate pressure main steam stop valve 172 (e.g., IP main stop valve). The IP main control valve 170 is actuated by one of the hydraulic actuators 168 (e.g., actuator 168A) to adjust (e.g., increase or decrease) a flow of the intermediate pressure steam into the intermediate pressure steam turbine 108, and the IP main stop valve 172 is actuated by one of the hydraulic actuators 168 (e.g., actuator 168B) to enable or disable (e.g., stop) the flow of the intermediate pressure steam into the intermediate pressure steam turbine 108.

The intermediate pressure bypass line 162 includes one or more intermediate pressure bypass valves 174, each driven or actuated by an independent hydraulic actuator 176 to move between open and closed positions. For example, the intermediate pressure bypass valves 174 may include an intermediate pressure bypass pressure control valve 178 (e.g., IP bypass control valve), an intermediate pressure bypass steam shutoff valve 180 (e.g., IP bypass shutoff valve), an intermediate pressure bypass spray water control valve 182 (e.g., IP bypass spray control valve), and an intermediate pressure bypass spray water isolation valve 184 (e.g., IP bypass spray isolation valve). The IP bypass control valve 178 is actuated by one of the hydraulic actuators 176 (e.g., actuator 176A) to adjust (e.g., increase or decrease) a pressure of the intermediate pressure bypass flow being diverted away from the IP steam supply line 160 to condenser 122. The IP bypass shutoff valve 180 is actuated by one of the hydraulic actuators 176 (e.g., actuator 176B) to enable or disable (e.g., stop) the bypass flow being diverted away from the IP steam supply line 160. The IP bypass spray control valve 182 is actuated by one of the hydraulic actuators 176 (e.g., actuator 176C) to adjust (e.g., increase or decrease) the flow of the water spray configured to attemperate the intermediate pressure bypass flow prior to return to the condenser 122. The IP bypass spray isolation valve 184 is actuated by one of the hydraulic actuators 176 (e.g., actuator 176D) to enable or disable (e.g., stop) the flow of a water spray configured to attemperate the intermediate pressure bypass flow prior to return to the condenser 122. In certain embodiments, the water used for the water spray is delivered from the condenser 122, a water tank, or another source of water in the HRSG 14.

As further illustrated in FIG. 1, the fluid control system 130 includes a low pressure steam supply line or conduit 190, a low pressure bypass line or conduit 192, and a discharge or return line 194. The low pressure steam supply line or conduit 190 is fluidly coupled to outlets of the low pressure evaporator 98 and the discharge or return line 164 from intermediate pressure steam turbine 108 and to an inlet into the low pressure steam turbine 110. The low pressure bypass line or conduit 192 is fluidly coupled to the low pressure steam supply line 190. The discharge or return line 194 is fluidly coupled to an outlet of the low pressure steam turbine 110 and an inlet into the low pressure economizer 100. As discussed above, the return line 194 includes the condenser 122 and the pump 124. The low pressure steam supply line 190 includes one or more low pressure main valves 196, each driven or actuated by an independent hydraulic actuator 198 to move between open and closed positions.

For example, as shown in FIG. 2, the low pressure main valves 196 may include a low pressure main steam control valve 200 (e.g., LP main control valve or admission valve) and a low pressure main steam stop valve 202 (e.g., LP main stop valve). The LP main control valve 200 is actuated by one of the hydraulic actuators 198 (e.g., actuator 198A) to adjust (e.g., increase or decrease) a flow of the low pressure steam into the low pressure steam turbine 110, and the LP main stop valve 202 is actuated by one of the hydraulic actuators 198 (e.g., actuator 198B) to enable or disable (e.g., stop) the flow of the low pressure steam into the low pressure steam turbine 110.

The low pressure bypass line 192 includes one or more low pressure bypass valves 204, each driven or actuated by an independent hydraulic actuator 206 to move between open and closed positions. For example, the low pressure bypass valves 204 may include a low pressure bypass pressure control valve 208 (e.g., LP bypass control valve), a low pressure bypass steam shutoff valve 210 (e.g., LP bypass shutoff valve), a low pressure bypass spray water control valve 212 (e.g., LP bypass spray control valve), and a low pressure bypass spray water isolation valve 214 (e.g., LP bypass spray isolation valve). The LP bypass control valve 208 is actuated by one of the hydraulic actuators 206 (e.g., actuator 206A) to adjust (e.g., increase or decrease) a pressure of the low pressure bypass flow being diverted away from the LP steam supply line 190. The LP bypass shutoff valve 210 is actuated by one of the hydraulic actuators 206 (e.g., actuator 206B) to enable or disable (e.g., stop) the bypass flow being diverted away from the LP steam supply line 190. The LP bypass spray control valve 212 is actuated by one of the hydraulic actuators 206 (e.g., actuator 206C) to adjust (e.g., increase or decrease) the flow of a water spray configured to attemperate the low pressure bypass flow prior to return to the condenser 122. The LP bypass spray isolation valve 214 is actuated by one of the hydraulic actuators 206 (e.g., actuator 206D) to enable or disable (e.g., stop) the flow of the water spray configured to attemperate the low pressure bypass flow prior to return to the condenser 122. In certain embodiments, the water used for the water spray is delivered from the condenser 122, a water tank, or another source of water in the HRSG 14.

The common HPU 18 is configured to provide hydraulic power to actuate or control operation of the main control system 132 and the bypass control system 134. For example, the common HPU 18 is configured to provide hydraulic power to actuate or control the main valves 142, 166, and 196 of the main control system 132 via the hydraulic actuators 144, 168, and 198, respectively. By further example, the common HPU 18 is configured to provide hydraulic power to actuate or control the bypass valves 150, 174, and 204 of the bypass control system 134 via the hydraulic actuators 152, 176, and 206, respectively. Advantageously, the components and functionality of the common HPU 18 are shared between both the main control system 132 and the bypass control system 134, thereby eliminating the need for separate hydraulic power units for main valves and bypass valves. The common HPU 18 has a plurality of shared components 220 as discussed in further detail below.

As shown in FIG. 1, the shared components 220 may include one or more hydraulic reservoirs or tanks 222, one or more hydraulic pumps 224, one or more hydraulic accumulators 226, a hydraulic conditioning, heating, and cooling system 228, and a monitoring and control system 229. The system 228 includes a thermal system 230 and a conditioning system 232 configured to control the temperature and quality of the hydraulic fluid (e.g., common hydraulic fluid used for main and bypass valves). The system 229 includes a monitoring system 234 and a control system 236 configured to monitor and control operation of the common HPU 18. The tanks 222 are configured to store the hydraulic fluid, including fresh/new hydraulic fluid, returned hydraulic fluid, and treated hydraulic fluid. The pumps 224 are configured to pressurize the hydraulic fluid to a sufficient pressure for both the main control system 132 and the bypass control system 134. The hydraulic accumulators 226 are configured to store the pressurized hydraulic fluid, so that sufficient hydraulic fluid is readily available for actuation of the main valves 142, 166, and 196 and the bypass valves 150, 174, and 204. The hydraulic accumulators 226 may include bladder type accumulators, piston-cylinder accumulators, spring-biased accumulators, metal bellows type accumulators, or another type of accumulator applying mechanical energy to store the pressurized hydraulic fluid. The hydraulic conditioning, heating, and cooling system 228 is configured to maintain a proper condition or quality of the hydraulic fluid and to maintain a proper temperature of the hydraulic fluid. For example, the thermal system 230 may include one or more heat exchangers, heaters, or coolers configured to transfer heat to or from the hydraulic fluid. The conditioning system 232 may include one or more particulate filters, water removal units, separators, or any combination thereof. The conditioning system 232 is configured to remove particulate matter, water, or other undesirable materials from the hydraulic fluid.

The system 229, including the monitoring and control systems 234 and 236, is configured to monitor and control operation of the common HPU 18, the fluid control system 130, and various aspects of the steam turbine system 16. The monitoring system 234 is configured to monitor a plurality of sensors 238, designated as "S", distributed throughout the combined cycle power plant 10. The control system 236 may include one or more controllers, each having one or more processors 240, memory 242, and instructions 244 stored on the memory 242 and executable by the processor(s) 240 to perform various control functions for delivering the hydraulic power to the main control system 132 and the bypass control system 134. The control system 236 of the common HPU 18 also may interact with a controller 246 of the combined cycle power plant 10, wherein the controller 246 includes one or more processors 248, memory 250, and instructions 252 stored on the memory 250 and executable by the processor(s) 248 to perform various control functions for operating the gas turbine system 12, the HRSG 14, the steam turbine system 16, and the fluid control system 130. In certain embodiments, the control system 236 may communicate information (e.g., sensor feedback, alerts, alarms, etc.) and/or provide control signals to the controller 246, or vice versa.

The sensors 238 may be communicatively coupled to the controller 246 and/or the control system 236 via communication wires or wireless communication circuity. The sensors 238 may be disposed at one or more locations in the air intake section 20, the compressor section 22, the combustor section 24, the turbine section 26, the HRSG 14, and the steam turbine system 16. For example, the sensors 238 may be disposed at one or more locations in each of the high pressure steam turbine 106, the intermediate pressure steam turbine 108, and the low pressure steam turbine 110. The sensors 238 also may be disposed along each of the lines 136, 138, 140, 160, 162, 164, 190, 192, and 194, thereby helping to monitor various fluid parameters between the HRSG 14, the steam turbines 106, 108, and 110, the main valves 142, 166, and 196, and the bypass valves 150, 174, and 204.

Additionally, the sensors 238 may be coupled to and/or distributed throughout the common HPU 18 communicating through controller 246, such as at each of the shared components 220 (e.g., tanks 222, pumps 224, accumulators 226, etc.). For example, the sensors 238 may include flow sensors, pressure sensors, temperature sensors, fluid level sensors, fluid composition sensors, flame sensors, vibration sensors, clearance sensors, trip sensors, or any combination thereof. The feedback from the sensors 238 may be used by the controller 246 and/or the control system 236 in a variety of ways.

In certain embodiments, if the controller 246 and/or the control system 236 observes undesirable sensor feedback within the HRSG 14, the steam turbine system 16, the fluid control system 130, or the common HPU 18, then the controller 246 and/or the control system 236 may provide an alarm or an alert to a user via an electronic display or may change operation of the common HPU 18 or the fluid control system 130. For example, depending on sensor feedback from the sensors 238, the controller 246 and/or the control system 236 may trigger a trip of the fluid control system 130, actuate the bypass valves 150, 174, and 204 to open or close using the common HPU 18, and/or actuate the main valves 142, 166, and 196 to open or close using the common HPU 18. In certain embodiments, the HPU 18 may provide the hydraulic power to partially or completely open the bypass valves 150, 174, and 204 and/or partially or completely close the main valves 142, 166, and 196. Additionally, the HPU 18 may provide the hydraulic power to partially or completely close the bypass valves 150, 174, and 204 and/or partially or completely open the main valves 142, 166, and 196.

The common HPU 18 is configured to provide hydraulic power using a hydraulic fluid, such as a self-extinguishing, fire-resistant fluid with a high auto-ignition temperature suitable for both the main valves 142, 166, and 196 and the bypass valves 150, 174, and 204. For example, the auto-ignition temperature may be greater than or equal to about 520, 540, 560, 580, or 600 degrees Celsius. The hydraulic fluid stored in the tanks 222 may include, for example, a self-extinguishing (fire-resistant) phosphate ester fluid. One such fluid is a self-extinguishing (fire-resistant) synthetic non-aqueous triaryl phosphate ester fluid. For example, the hydraulic fluid may include trixylenyl phosphate, trixylenyl and t-butylphenyl phosphate, t-butylphenyl phosphate having 15-25% triphenyl phosphate, t-butylphenyl phosphate having low levels (e.g., less than 1, 2, 3, 4, 5%) of triphenyl phosphate, or any combination thereof. In certain embodiments, the hydraulic fluid may include one or more of the self-extinguishing fluids described above, which are sold under the tradename FYRQUEL® by ICL Industrial Products of Gallipolis Ferry, WV, and which are distributed globally.

The common HPU 18 may be configured to pressurize the hydraulic fluid to a pressure suitable for both the main valves 142, 166, and 196 and the bypass valves 150, 174, and 204.

For example, the HPU 18 may be configured to pressurize the hydraulic fluid up to a pressure of at least 2400, 2500, or 2600 psig in certain embodiments. Again, the same hydraulic fluid and its associated properties may be used for both the main valves 142, 166, and 196 and the bypass valves 150, 174, and 204.

As illustrated in FIG. 1, the common HPU 18 supplies the pressurized hydraulic fluid to each of the hydraulic actuators 144, 152, 168, 176, 198, and 206 of the respective valves 142, 150, 166, 174, 196, and 204 via one or more hydraulic supply lines or conduits 254, and the common HPU 18 receives a return hydraulic fluid from each of the hydraulic actuators 144, 152, 168, 176, 198, and 206 of the respective valves 142, 150, 166, 174, 196, and 204 via one or more hydraulic return lines or conduits 256. In certain embodiments, each of the hydraulic actuators 144, 152, 168, 176, 198, and 206 may have a dedicated or independent hydraulic supply line 254 and a dedicated or independent hydraulic return line 256. Additionally, in certain embodiments, the common HPU 18 may deliver the pressurized hydraulic fluid to the hydraulic actuators 144, 152, 168, 176, 198, and 206 in one or more groups, such as groups of bypass valves, groups of main valves, and/or groups of valves associated with the high pressure steam turbine 106, the intermediate pressure steam turbine 108, and/or the low pressure steam turbine 110.

FIG. 2 is a schematic of an embodiment of the steam turbine system 16 and the fluid control system 130 coupled to the HRSG 14 and the common HPU 18 of FIG. 1, further illustrating details of the main control system 132 and the bypass control system 134. Unless stated otherwise, each of the components illustrated in FIG. 2 are the same as described in detail above with reference to FIG. 1. Although FIG. 2 does not illustrate certain details and components shown in FIG. 1, these components are part of the illustrated system of FIG. 2. For example, the HRSG 14 and the common HPU 18 include the components and functions described above with reference to FIG. 1. Additional details, which are not shown in FIG. 1 for simplicity, are further illustrated in FIG. 2.

As illustrated in FIG. 2, the high pressure steam supply line 136 extends in a steam flow direction from the HRSG 14 to the inlet of the high pressure steam turbine 106, while the high pressure bypass line 138 extends in a bypass flow direction from the high pressure steam supply line 136 back to the HRSG 14. As described above, the HP main control valve 146 and the HP main stop valve 148 are configured to control the high pressure steam flow along high pressure steam supply line 136 to the high pressure steam turbine 106, and the HP bypass control valve 154 is configured to control the high pressure steam bypass flow along the high pressure bypass line 138 from the high pressure steam supply line 136 back to the HRSG 14. As further illustrated in FIG. 2, the HP bypass spray isolation valve 156 and the HP bypass spray control valve 158 are disposed along a water supply line or conduit 260 leading to one or more spray nozzles 262, which are configured to inject a water spray into the high pressure bypass line 138 to attemperate the high pressure steam bypass flow prior to return to the HRSG 14. The water supply line or conduit 260 may be coupled to the feedwater line 126, a water supply tank, or another source of water.

The valves for the intermediate pressure steam turbine 108 have a similar arrangement as the valves for the high pressure steam turbine 106. For example, the intermediate pressure steam supply line 160 extends in a steam flow direction from the HRSG 14 to the inlet of the intermediate pressure steam turbine 108, while the intermediate pressure bypass line 162 extends in a bypass flow direction from the intermediate pressure steam supply line 160 back to the condenser 122. The IP main control valve 170 and the IP main stop valve 172 are configured to control the intermediate pressure steam flow along intermediate pressure steam supply line 160 to the intermediate pressure steam turbine 108. The IP bypass control valve 178 and the IP bypass shutoff valve 180 are configured to control the intermediate pressure steam bypass flow along the intermediate pressure bypass line 162 from the intermediate pressure steam supply line 160 back to the condenser 122. As further illustrated in FIG. 2, the IP bypass spray isolation valve 184 and the IP bypass spray control valve 182 are disposed along a water supply line or conduit 264 leading to one or more spray nozzles 266, which are configured to inject a water spray into the intermediate pressure bypass line 162 to attemperate the intermediate pressure steam bypass flow prior to return to the condenser 122. The water supply line or conduit 264 may be coupled to the condenser 122, a water supply tank, or another source of water.

The valves for the low pressure steam turbine 110 have a similar arrangement as the valves for the high and intermediate pressure steam turbines 106 and 108. For example, the low pressure steam supply line 190 extends in a steam flow direction from the HRSG 14 to the inlet of the low pressure steam turbine 110, while the low pressure bypass line 192 extends in a bypass flow direction from the low pressure steam supply line 190 back to the condenser 122. The LP main control valve 200 and the LP main stop valve 202 are configured to control the low pressure steam flow along low pressure steam supply line 190 to the low pressure steam turbine 110. The LP bypass control valve 208 and the LP bypass shutoff valve 210 are configured to control the low pressure steam bypass flow along the low pressure bypass line 192 from the low pressure steam supply line 190 back to the condenser 122. As further illustrated in FIG. 2, the LP bypass spray isolation valve 214 and the LP bypass spray control valve 212 are disposed along a water supply line or conduit 268 leading to one or more spray nozzles 270, which are configured to inject a water spray into the low pressure bypass line 192 to attemperate the low pressure steam bypass flow prior to return to the condenser 122. The water supply line or conduit 268 may be coupled to the condenser 122, a water supply tank, or another source of water.

In operation, the common HPU 18 is configured to supply the pressurized hydraulic fluid through one or more hydraulic supply lines 254 to each of the hydraulic actuators 144, 152, 168, 176, 198, and 206 of the respective valves 142, 150, 166, 174, 196, and 204, thereby providing shared hydraulic power for both the main control system 132 (e.g., main valves 142, 166, and 196) and the bypass control system 134 (e.g., bypass valves 150, 174, and 204). The common HPU 18 also includes one or more hydraulic return lines 256 coupled to the hydraulic actuators 144, 152, 168, 176, 198, and 206 of the respective valves 142, 150, 166, 174, 196, and 204, thereby returning hydraulic fluid back to the common HPU 18. All other aspects of the HPU 18, the fluid control system 130, the HRSG 14, and the steam turbine system 16 are the same as described in detail above.

Figure 3:
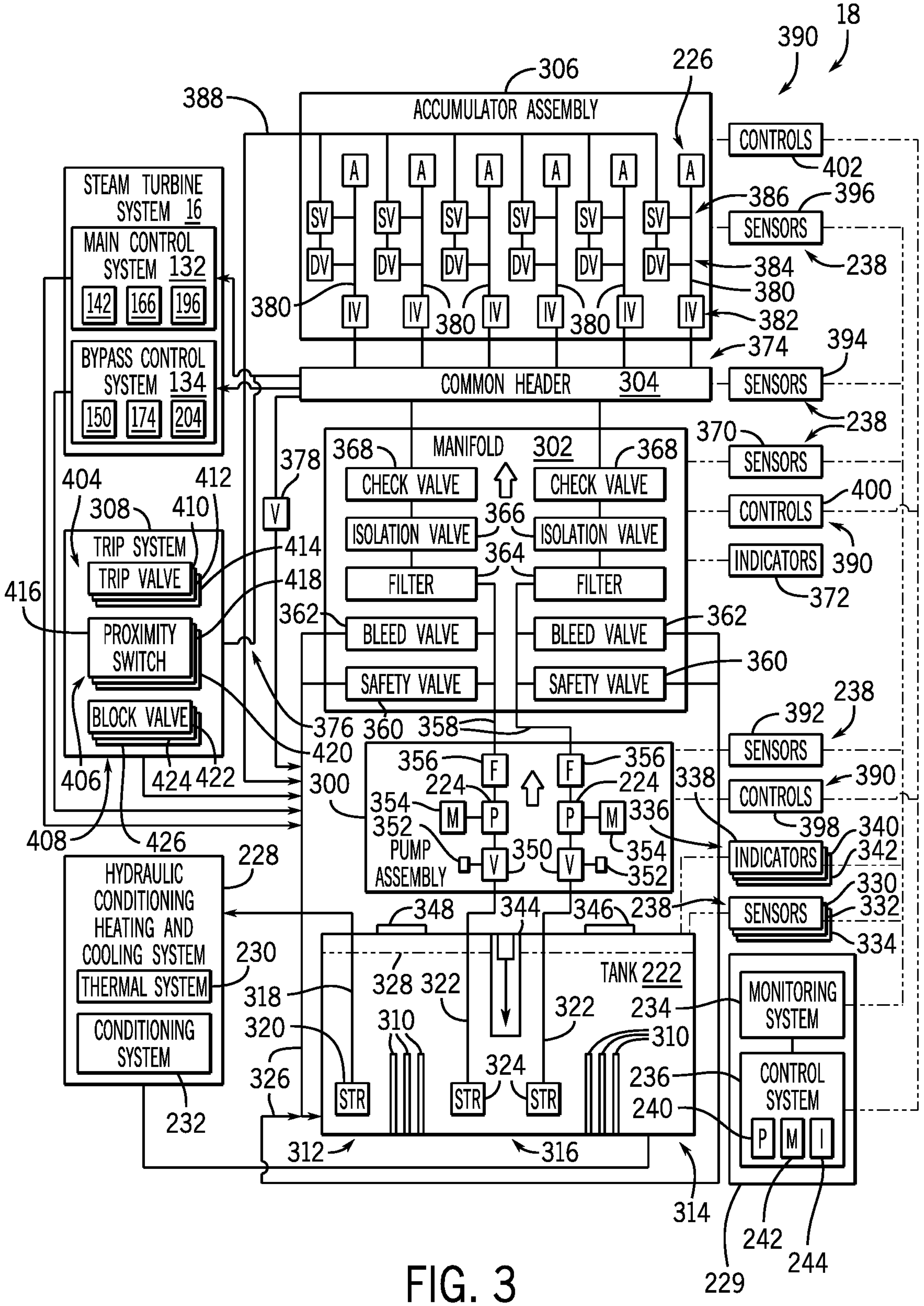
FIG. 3 is a schematic of an embodiment of the common HPU of FIGS. 1 and 2, further illustrating details of shared components used for both the main control system and the bypass control system.

FIG. 3 is a schematic of an embodiment of the common HPU 18 of FIGS. 1 and 2, further illustrating details of the shared components 220 used for both the main control system 132 and the bypass control system 134. Unless stated otherwise, each of the components illustrated in FIG. 3 are the same as described in detail above with reference to FIGS. 1 and 2. Although FIG. 3 does not illustrate certain details and components shown in FIGS. 1 and 2, these components are part of the illustrated system of FIG. 3. Additional details, which are not shown in FIGS. 1 and 2 for simplicity, are further illustrated in FIG. 3.

As illustrated in FIG. 3, the common HPU 18 includes the tank 222, a pump assembly 300 having a plurality of the pumps 224 coupled to the tank 222, a manifold 302 (e.g., a common or one-piece manifold) coupled to the pump assembly 300, a header 304 (e.g., a common or one-piece header) coupled to the manifold 302, an accumulator assembly 306 having a plurality of the accumulators 226 coupled to the header 304, a trip system 308 coupled to the tank 222 and the main control system 132, the hydraulic conditioning, heating, and cooling system 228 coupled to the tank 222, and the monitoring and control system 229 coupled to various components of the common HPU 18.

In certain embodiments, the tank 222 may include a single tank split into multiple sections, multiple separate tanks, or a combination thereof. The design, capacity, and surface area of the tank 222 may be configured to increase air detrainment, increase flow distribution within the tank, and reduce the footprint size of the tank 222. The tank 222 may include suction lines, discharge lines, and internal baffles 310 inside the tank 222 arranged to improve air detrainment of the hydraulic fluid, e.g., triaryl phosphate ester hydraulic fluid, which may be prone to air entrainment and varnishing at high fluid temperatures. In certain embodiments, the tank 222 may be split into three sections: a fluid return section 312, a detraining section 314, and a main pump section 316. The fluid return section 312 includes one or more dip tubes 318 coupled to one or more strainers 320 configured to draw the hydraulic fluid for cooling and conditioning by the system 228. The detraining section 314 is configured to receive a return flow of the cooled hydraulic fluid from the system 228. The main pump section 316 has one or more dip tubes 322 coupled to one or more strainers 324 configured to feed the hydraulic fluid into the pumps 224 of the pump assembly 300. The HPU 18 may include one or more drain return lines 326 configured to discharge the hydraulic fluid into the tank 222 below an operating fluid level 328 to reduce aeration. In certain embodiments, the tank 222 may include customer connections for the hydraulic fluid drain return flow back from the steam valves (e.g., the main valves 142, 166, and 196 and the bypass valves 150, 174, and 204), wherein the drain return flow back to the tank 222 terminates below the operating fluid level 328.

The tank 222 also may include a variety of sensors 238, such as a fluid level transmitter or sensor 330, a fluid temperature transmitter or sensor 332, and a fluid pressure transmitter or sensor 334, which are configured to monitor a fluid level, a fluid temperature, and a fluid pressure of the hydraulic fluid in the tank 222. The fluid level sensor 330 is configured to monitor the level of hydraulic fluid in the tank 222, thereby enabling the monitoring and control system 229 to trigger alarms for excessive high or low levels of the hydraulic fluid in the tank 222. The fluid temperature sensor 332 is configured to monitor the temperature of the hydraulic fluid in the tank 222, thereby enabling the monitoring and control system 229 to trigger alarms in response to high hydraulic fluid temperatures, such as greater than 50, 60, or 70 degrees Celsius. The fluid pressure sensor 334 is configured to monitor the pressure of the hydraulic fluid in the tank 222, thereby enabling the monitoring and control system 229 to trigger alarms in response to high or low pressures in the tank 222 (e.g., based on upper and lower pressure thresholds) as well as to start and stop the pumps 224.

The tank 222 also may include a variety of visual gauges or indicators 336, such as a fluid level indicator 338, a fluid temperature indicator 340, and a fluid pressure indicator 342, which are configured to provide a local visual indication of a fluid level, a fluid temperature, and a fluid pressure of the hydraulic fluid in the tank 222. The visual gauges or indicators 336 may include mechanical gauges, electronic gauges or displays, or any combination thereof. In certain embodiments, the indicators 336 may be independent from one another, or the indicators 336 may be integrated into a single common indicator (e.g., an electronic display coupled to a processor-based unit, a computer, or a controller). The tank 222 also may include one or more tank magnets 344 configured to collect any ferrous particles in the hydraulic fluid within the tank 222.

The tank 222 may be a stainless steel tank having the internal baffles 310. The internal baffles 310 create a fluid flow path from the fluid return section 312 to the main pump section 316, which allows for sufficient de-aeration time for the hydraulic fluid. The tank 222 volume is sized to hold all of the hydraulic fluid in the system, including the amount of hydraulic fluid in the feed and drain lines, wherein substantially all of the hydraulic fluid will flow back to the tank 222 during a shutdown condition. The pumps 224, accumulators 226, heat exchangers (e.g., thermal system 230), filters (e.g., conditioning system 232), manifolds (e.g., 302), and valves may be mounted on the top and/or side walls of the tank 222. The tank 222 also may include access hatches 346 and 348 (e.g., removable access panels) to enable user access inside the tank 222.

The common HPU 18 includes the pump assembly 300 having the plurality of pumps 224, which may be the same or different from one another. For example, the pumps 224 may include two or more redundant pumps, such as rotary pumps, axial reciprocating pumps, or a combination thereof. For example, the pumps 224 may include two or more redundant pressure-compensated, variable-displacement, axial-piston pumps. In certain embodiments, one or more pumps 224 (e.g., primary pumps) are configured for normal operation, while one or more pumps 224 (e.g., secondary pumps) are configured as backup pumps. The pumps 224 may be driven by AC motors, DC motors, or a combination thereof.

The pumps 224 may be configured to pressurize the hydraulic fluid to a suitable pressure (e.g., at least 2400, 2500, or 2600 psig) for both the main valves 142, 166, and 196 and the bypass valves 150, 174, and 204. The maximum flow of the pumps 224 may be set by a maximum volume stop at operating pressure and the rated motor load current. The discharge pressure of the pumps 224 may be maintained constant by a pressure compensator, which modulates a discharge flow to maintain a given pressure at the outlet of each pump 224, provided that the downstream system creates a sufficient back pressure. The suction side of each pump 224 may include a pump suction isolation valve 350 and position switches 352 (included as part of the sensors 238 coupled to the pump assembly 300). The pump suction isolation valve 350 is in fluid communication with at least one of the dip tubes 322 in the tank 222. The strainer 324, which is coupled to the dip tube 322, is configured to protect the pump 224 against larger particulates/foreign objects being sucked into the pump 224. The pump suction isolation valve 350 is configured to isolate the suction side of the pump 224 from the tank 222 during maintenance of the pump 224. The position switches 352 are configured to detect the position of the pump suction isolation valve 350 (e.g., open or closed valve position) and provide a permissive (e.g., valve fully open) for starting a motor 354 of the pump 224. The discharge side of each pump 224 also may include one or more filters 356 configured to remove contaminants upstream of the manifold 302.

The manifold 302 may include and/or couple with a plurality of valves and filters along each of a plurality of fluid flow paths, circuits, or lines 358, which are coupled with the plurality of pumps 224 of the pump assembly 300. In other words, each pump 224 has its own redundant line 358 through the manifold 302 to the header 304. For each line 358 coupled to a respective pump 224, the manifold 302 may include one or more of a safety valve 360 (e.g., safety pressure relief valve), a bleed valve 362 (e.g., air bleed valve), a filter 364 (e.g., high pressure particulate filter), an isolation valve 366, and a check valve 368. The safety valve 360 may be configured to protect the line 358 from over-pressurization in the event of a pump compensator failure, a component mis-adjustment, or another problem. The bleed valve 362 may be configured to automatically bleed air to the drain return line 326 on startup and then close for normal operation. The filters 364 may be configured to filter out particulate or other contaminants in the hydraulic fluid. The isolation valves 366 and the check valves 368 are configured to enable changes of the filters 364 during operation.

The manifold 302 also includes and/or couples with one or more sensors 238 (e.g., sensors 370) and visual gauges or indicators 372. For example, the sensors 370 and indicators 372 may be coupled to the safety valves 360, the bleed valves 362, the filters 364, the isolation valves 366, and/or the check valves 368. The sensors 370 may include, for example, temperature sensors, flow rate sensors, fluid composition sensors, and/or pressure sensors (e.g., differential pressure sensors). In certain embodiments, the sensors 370 (e.g., differential pressure sensors) are configured to monitor a differential pressure across the filters 364 and trigger alarms in response to high differential pressures (e.g., based on one or more pressure thresholds). Accordingly, the sensors 370 may include pressure sensors disposed upstream and downstream of the filters 364, e.g., discharge pressure sensors at the discharge of the pumps 224 and header pressure sensors at the header 304. Similarly, the indicators 372 may include, for example, temperature indicators, flow rate indicators, fluid composition indicators, and/or pressure indicators (e.g., differential pressure indicators). In certain embodiments, the indicators 372 (e.g., differential pressure indicators) are configured to indicate a differential pressure (e.g., pressure drop) across the filters 364.

The manifold 302 then routes the hydraulic fluid into the header 304, which in turn couples with the accumulator assembly 306 via an accumulator manifold 374, the trip system 308 via a trip manifold 376, and a bypass valve 378 extending to the tank 222. The bypass valve 378 is configured to enable draining of the header 304 to the tank 222 for maintenance and/or commissioning of the pumps 224.

The accumulator assembly 306 is configured to receive the hydraulic fluid from the common header 304 and provide instantaneous flow during transient conditions, such as valve actuator transients (e.g., resetting valves after a trip event). The accumulator assembly 306 may include the hydraulic accumulators 226, such as 1, 2, 3, 4, 5, 6, 7, 8, 9, 10, or more hydraulic accumulators 226. The size and quantity of the hydraulic accumulators 226 may depend on system demand during transient conditions (such as a turbine reset). The hydraulic accumulators 226 may include, for example, bladder type hydraulic accumulators, such as accumulators with one side of a bladder pre-charged with a gas (e.g., inert gas such as nitrogen gas) and the other side of the bladder storing pressurized hydraulic fluid. The hydraulic accumulators 226 also may include a piston-cylinder accumulator, a bellows accumulator, or any other pressure storage reservoir. During high flow transient demands, the pressurized hydraulic fluid stored in the hydraulic accumulators 226 (e.g., bladder type hydraulic accumulators) is configured to provide additional capacity to maintain header pressure in the header 304. For example, the hydraulic accumulators 226 are designed to provide sufficient capacity to handle the demands of the main control system 132, the bypass control system 134, and the trip system 308.

Each hydraulic accumulator 226 is disposed along a fluid path, circuit, or line 380 having an isolation valve 382, a drain valve 384, and a safety valve 386 (e.g., safety pressure relief valve). The isolation valves 382 are configured to open or close to enable or disable pressure transfer from the hydraulic accumulators 226 to the header 304. The drain valves 384 are configured to drain hydraulic fluid through drain return lines 388, 326 back to the tank 222. The safety valves 386 are configured to relieve pressure to protect the accumulator assembly 306 from an over pressure condition. The safety valves 386 may be configured to return hydraulic fluid back to the tank 222 via the drain return lines 388, 326. The isolation valves 382 and the drain valves 384 may be configured to enable maintenance of the accumulator assembly 306 by isolating the accumulator assembly 306 from the header 304 and draining hydraulic fluid to the tank 222.

The common HPU 18 may include a variety of the sensors 238 and controls 390 configured to monitor and control components of the common HPU 18, including the tank 222, the pump assembly 300, the manifold 302, the header 304, the accumulator assembly 306, and the trip system 308. In certain embodiments, the sensors 238 include pressure sensors, temperature sensors, fluid level sensors, fluid composition sensors, flow rate sensors, or any combination thereof, at each of the illustrated components. For example, the sensors 238 may include the sensors 238 (e.g., 330, 332, and 334) coupled to the tank 222 as discussed above, sensors 238 (e.g., 392) coupled to the pump assembly 300, the sensors 238 (e.g., 370) coupled to the manifold 302 as discussed above, sensors 238 (e.g., 394) coupled to the header 304, and sensors 238 (e.g., 396) coupled to the accumulator assembly 306. Similarly, the controls 390 may include controls 398, 400, and 402 coupled to the pump assembly 300, the manifold 302, and the accumulator assembly 306, respectively. These sensors 238 and controls 390 are configured to enable the monitoring and control system 229 to monitor operating parameters of the common HPU 18 and to control various components to ensure proper supply of hydraulic fluid for the steam turbine system 16 (e.g., main control system 132 and bypass control system 134).

The sensors 238, such as the sensors 330, 332, and 334 coupled to the tank 222 and the sensors 370 coupled to the manifold 302, are already described in detail above. The sensors 238 coupled to the pump assembly 300 (e.g., one or more sensors 392) may include pump discharge pressure sensors configured to monitor a discharge pressure from the pumps 224. The sensors 238 coupled to the header 304 (e.g., one or more sensors 394) may include one or more header pressure sensors (e.g., three header pressure sensors) configured to monitor a header pressure of the header 304. The monitoring and control system 229 may be configured to start and/or increase the speed of the pumps 224 if the header pressure drops below a first threshold header pressure, such as below 1800, 1850, 1900, 1950, or 2000 PSIG. In certain embodiments, the monitoring and control system 229 may be configured to trigger an alarm and trip the common HPU 18 if two out of three header pressure sensors indicate a low pressure of the header 304 (e.g., below a second threshold header pressure). The second threshold header pressure may be less than the first threshold header pressure, such as below 1500, 1550, 1600, 1650, or 1700 PSIG. Similarly, the sensors 238 coupled to the accumulator assembly 306 (e.g., one or more sensors 396) may be configured to measure fluid pressure, such that the monitoring and control system 229 may be configured to trigger alarms and/or trips if the fluid pressure drops below one or more pressure thresholds.

The controls 390, such as the controls 398, 400, and 402, may be configured to actuate valves, control operation and speed of the motors 354 driving the pumps 224, and generally control the fluid flow through the common HPU 18. For example, the controls 398 may be configured to control the opening and closing of the isolation valves 350 and to start and/or control the speed of the motors 354 of the pumps 224 in the pump assembly 300. Similarly, the controls 400 may be configured to control the opening and closing of the bleed valves 362, and the isolation valves 366 of the manifold 302. By further example, the controls 402 may be configured to control the opening and closing of the isolation valves 382, the drain valves 384, and the safety valves 386 of the accumulator assembly 306. Additionally, in certain embodiments, the controls 402 may be configured to control pressurization in each of the accumulators 226, such as by controlling a gas pressure (e.g., inert gas such as nitrogen gas) used to maintain a pressure of the stored hydraulic fluid.

As discussed above, the common HPU 18 includes the trip system 308 configured to protect the steam turbine system 16 in the event of a turbine protection trip event. The trip system 308 is configured to provide pressurized hydraulic fluid to the steam turbine valves (e.g., main valves 142, 166, 196), which acts as a permissive for the valves (e.g., main valves 142, 166, 196) to operate in a normal operating control mode. Upon a trip, the trip system 308 depressurizes the hydraulic fluid trip supply (FSS) to the steam valves (e.g., main valves 142, 166, 196), causing them to rapidly move to their safe (e.g., trip mode) position. The trip system 308 may be configured with a two-out-of-three system, which works on the two-out-of-three voting logic.

The trip system 308 includes the following components: electronic trip devices (ETDs) having trip valves 404, proximity switches 406, and block valves 408. The trip valves 404 may include trip valves 410, 412, and 414, such as solenoid valves, configured to operate as pilots to drive the main directional control valves. The proximity switches 406 may include proximity switches 416, 418, and 420 configured to monitor the position of the ETDs (e.g., trip valves 410, 412, and 414) and provide feedback to the controller 246 and/or the control system 236. The block valves 408 may include block valves 422, 424, and 426 configured to block the hydraulic fluid trip supply (FSS) from entering a main trip oil header and the ETDs (e.g., trip valves 404) during a trip mode and to enable flow through the ETDs (e.g., trip valves 404) during a reset mode. The trip system 308 is designed to maintain main header pressure (e.g., common header 304) during a trip mode, by blocking flow to the trip manifold using the block valves 408. The trip system 308 configuration (with two-out-of-three voting logic) allows for the ETDs (e.g., trip valves 404) to be individually tested on-line (without tripping the system), to assure proper functioning during a trip event. When a trip is initiated, the three ETDs (e.g., trip valves 404) de-energize to rapidly depressurize the hydraulic fluid trip supply (FSS) and drain the trip hydraulic fluid back to the tank 222. The path of the trip hydraulic fluid is controlled by the directional control valves.

As illustrated, the hydraulic conditioning, heating, and cooling system 228 includes the thermal system 230 and the conditioning system 232 configured to control the temperature and quality of the hydraulic fluid. For example, the thermal system 230 is configured to heat and/or cool the hydraulic fluid to maintain a temperature of the hydraulic fluid within upper and lower temperature thresholds. The conditioning system 232 is configured to condition the hydraulic fluid by, for example, removing water, particulates, or other undesirable materials from the hydraulic fluid. Additional details of the hydraulic conditioning, heating, and cooling system 228 are discussed in detail below with reference to FIG. 4.

Figure 4:
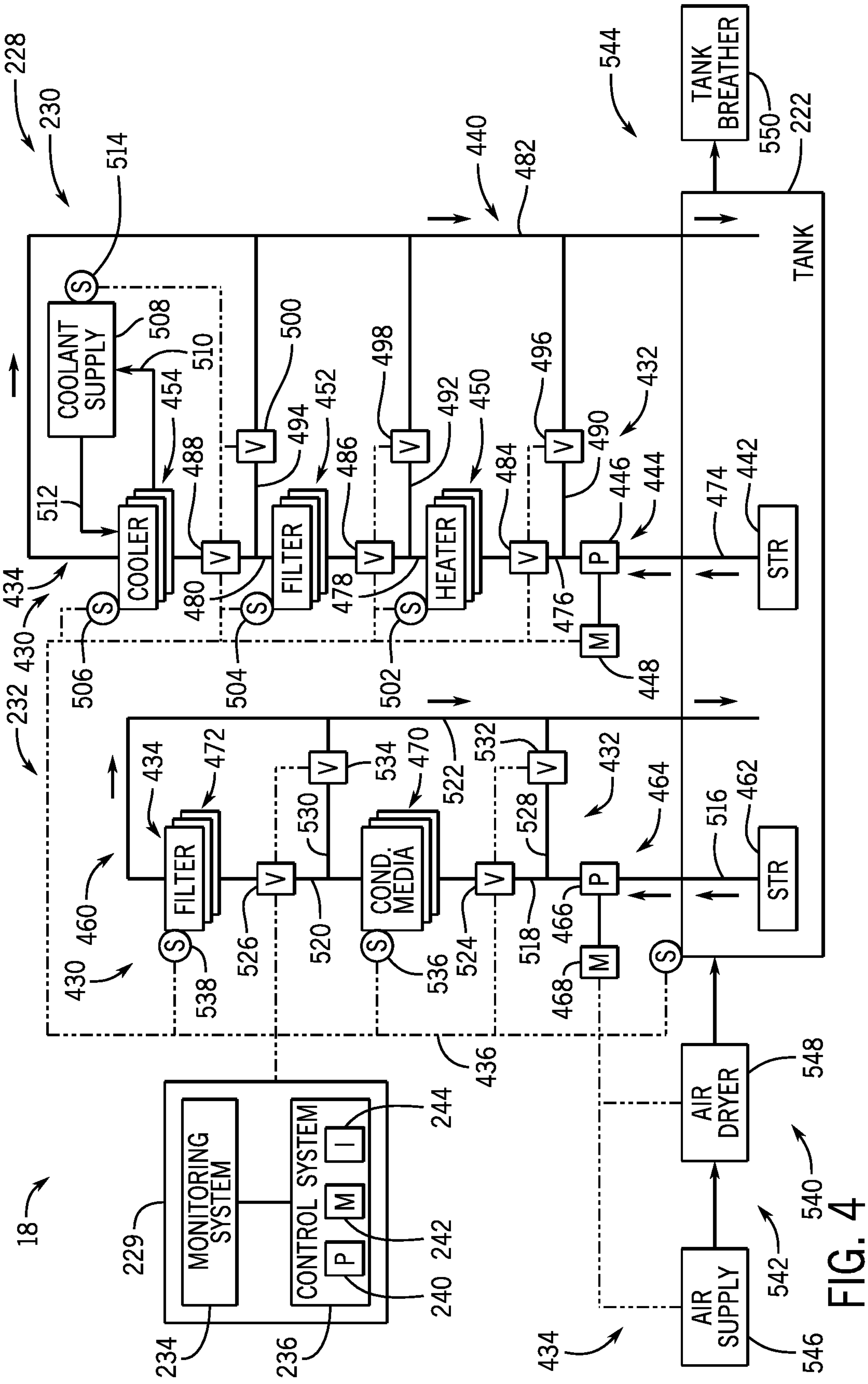
FIG. 4 is a schematic of an embodiment of a hydraulic conditioning, heating, and cooling system of the common HPU of FIGS. 1-3.

FIG. 4 is a schematic of an embodiment of the hydraulic conditioning, heating, and cooling system 228 of the common HPU 18 of FIGS. 1-3. In the illustrated embodiment, the monitoring and control system 229 of the common HPU 18 is communicatively coupled to various sensors 430, valves 432, and components 434 of the hydraulic conditioning, heating, and cooling system 228 as indicated by dashed lines 436, such that the monitoring system 234 can monitor sensor feedback from the sensors 430 and the control system 236 can control operation of the valves 432 and the components 434 to control the temperature and quality of the hydraulic fluid. The thermal system 230 includes a thermal control flow path or loop 440 coupled to the tank 222, wherein the loop 440 includes a suction strainer 442 disposed in the tank 222, a pump motor assembly 444 having a pump 446 driven by a motor 448, one or more heaters 450, one or more filters 452, and one or more coolers 454. In certain embodiments, the heaters 450, the filters 452, and the coolers 454 may be arranged in a different sequence or in parallel with one another.

Similarly, the conditioning system 232 includes a conditioning flow path or loop 460, wherein the loop 460 includes a suction strainer 462 disposed in the tank 222, a pump motor assembly 464 having a pump 466 driven by a motor 468, one or more conditioning media 470, and one or more filters 472. In certain embodiments, the conditioning media 470 and the filters 472 may be arranged in a different sequence or in parallel with one another. Each of the loops 440 and 460 includes various sensors 430 and valves 432 to facilitate monitoring and control by the monitoring and control system 229. During operation of the common HPU 18, the pump motor assemblies 444 and 464 may be run continuously to circulate the hydraulic fluid through the thermal system 230 and the conditioning system 232.

The loop 440 of the thermal system 230 includes a plurality of fluid conduits interconnecting the components. For example, the loop 440 includes a fluid conduit 474 (e.g., supply conduit) between the suction strainer 442 and the pump 446, a fluid conduit 476 between the pump 446 and the heaters 450, a fluid conduit 478 between the heaters 450 and the filters 452, a fluid conduit 480 between the filters 452 and the coolers 454, and a fluid conduit 482 (e.g., return conduit) between the coolers 454 and the tank 222. In the illustrated embodiments, the valves 432 in the loop 440 may include valves 484, 486, and 488 along the respective fluid conduits 476, 478, and 480 to facilitate control of the fluid flow through the heaters 450, the filters 452, and the coolers 454. For example, the valves 484, 486, and 488 may include one-way valves (e.g., check valves), safety valves, pressure control valves, thermostatic control valves, distribution or transfer valves, or any combination thereof. For example, the valves 484 may distribute the flow of hydraulic fluid to each of the heaters 450 in equal or different flow rates and pressures, the valves 486 may distribute the flow of hydraulic fluid to each of the filters 452 in equal or different flow rates and pressures, and the valves 488 may distribute the flow of hydraulic fluid to each of the coolers 454 in equal or different flow rates and pressures.

Additionally, the fluid conduits 476, 478, and 480 may be coupled to the fluid conduit 482 via conduits 490, 492, and 494 having respective valves 496, 498, and 500. The valves 496, 498, and 500 are configured to open and close fluid flow through the conduits 490, 492, and 492 to the fluid conduit 482 (e.g., return conduit), thereby enabling a bypass flow of the hydraulic fluid between pump 446, the heaters 450, the filters 452, and the coolers 454. In certain embodiments, the valves 496, 498, and 500 may include pressure relief valves or thermostatic control valves. The pressure relief valves may open upon reaching one or more pressure thresholds in the fluid flow of hydraulic fluid. The thermostatic control valves may regulate the fluid flow of hydraulic fluid based on temperature of the hydraulic fluid, and thus may open upon reaching one or more temperature thresholds in the fluid flow of hydraulic fluid.

As further illustrated, the sensors 430 in the loop 440 may include sensors 502, 504, and 506 coupled to the heaters 450, the filters 452, and the coolers 454. The sensors 430 may be configured to monitor temperature, pressure, flow rate, content of contaminants (e.g., water), or any combination thereof. For example, the sensors 502 may monitor the foregoing parameters (e.g., temperature) at upstream, internal, and/or downstream locations relative to each of the heaters 450. Similarly, the sensors 506 may monitor the foregoing parameters (e.g., temperature) at upstream, internal, and/or downstream locations relative to each of the coolers 454. The sensors 504 may monitor the foregoing parameters (e.g., pressure) at upstream, internal, and/or downstream locations relative to each of the filters 452. For example, the sensors 504 (e.g., pressure sensors) may monitor a pressure drop across each of the filters 452, such that the monitoring system 234 may trigger an alarm if the pressure drop exceeds one or more pressure thresholds. The foregoing sensor measurements are used by the monitoring and control system 229 to increase or decrease flow of the hydraulic fluid through the thermal system 230 to maintain a temperature between upper and lower temperature thresholds.

The heaters 450, the filters 452, and the coolers 454 of the thermal system 230 may include a variety of configurations and equipment. For example, the heaters 450 may include electric heaters, heat exchangers configured to transfer heat between the hydraulic fluid from the tank 222 and a thermal fluid (e.g., heated water), heating solenoids configured to block flow of the thermal fluid to the coolers 454, or a combination thereof. The filters 452 may include particulate filters, such as cartridge filters, configured to capture any particulate over a threshold size. In certain embodiments, the filters 452 may have a rating of Beta3>200. The coolers 454 may include heat exchangers configured to exchange heat between the hydraulic fluid from the tank 222 and a thermal fluid (e.g., water) via one or more coolant supplies 508, which are coupled to the coolers 454 via fluid conduits 510 and 512. The heat exchangers of the coolers 454 may include, for example, 100% capacity heat exchangers. The sensors 430 may further include one or more sensors 514 coupled to the coolant supplies 508, such that the monitoring system 234 can monitor parameters of the coolant supplies 508 (e.g., temperature of the thermal fluid).

The loop 460 of the conditioning system 232 includes a plurality of fluid conduits interconnecting the components. For example, the loop 460 includes a fluid conduit 516 (e.g., supply conduit) between the suction strainer 462 and the pump 466, a fluid conduit 518 between the pump 466 and the conditioning media 470, a fluid conduit 520 between the conditioning media 470 and the filters 472, and a fluid conduit 522 (e.g., return conduit) between the filters 472 and the tank 222. In the illustrated embodiments, the valves 432 in the loop 460 may include valves 524 and 526 along the respective fluid conduits 518 and 520 to facilitate control of the fluid flow through the conditioning media 470 and the filters 472. For example, the valves 524 and 526 may include one-way valves (e.g., check valves), safety valves, pressure control valves, distribution or transfer valves, or any combination thereof. For example, the 524 may distribute the flow of hydraulic fluid to each of the conditioning media 470 in equal or different flow rates and pressures, and the valves 526 may distribute the flow of hydraulic fluid to each of the filters 472 in equal or different flow rates and pressures.

Additionally, the fluid conduits 518 and 520 may be coupled to the fluid conduit 522 via conduits 528 and 530 having respective valves 532 and 534. The valves 532 and 534 are configured to open and close fluid flow through the conduits 518 and 520 to the fluid conduit 522 (e.g., return conduit), thereby enabling a bypass flow of the hydraulic fluid between the pump 466, the conditioning media 470, and the filters 472. In certain embodiments, the valves 532 and 534 may include pressure relief valves. The pressure relief valves may open upon reaching one or more pressure thresholds in the fluid flow of hydraulic fluid.

As further illustrated, the sensors 430 in the loop 460 may include sensors 536 and 538 coupled to the conditioning media 470 and the filters 472. The sensors 536 and 538 may be configured to monitor temperature, pressure, flow rate, content of contaminants (e.g., water), or any combination thereof. For example, the sensors 536 and 538 may monitor the foregoing parameters at upstream, internal, and/or downstream locations relative to each of the conditioning media 470 and filters 472. In certain embodiments, the sensors 536 and 538 (e.g., pressure sensors) may monitor a pressure drop across each of the conditioning media 470 and filters 472, such that the monitoring system 234 may trigger an alarm if the pressure drop exceeds one or more pressure thresholds. The foregoing sensor measurements are used by the monitoring and control system 229 to increase or decrease flow of the hydraulic fluid through the conditioning system 232 to maintain a suitable quality of the hydraulic fluid (e.g., particulate and/or water content less than a threshold).

The conditioning media 470 and the filters 472 of the conditioning system 232 may include a variety of configurations and equipment. In certain embodiments, the conditioning media 470 may include an ion exchange type acid control media to keep the hydraulic fluid total acid number (TAN) under a threshold to help reduce the possibility of fluid varnishing. The filters 472 may include particulate filters, water removal elements, or a combination thereof. For example, the filters 472 may include cartridge filters, centrifugal separators, gravity separators, or any combination thereof. The filters 472 (e.g., particulate filters) may have a rating of Beta3>200.

The tank 222 may further couple to an air drying system 540 having an air intake system 542 and an air discharge system 544. The air intake system 542 may include an air supply 546 and an air dryer 548 configured to supply and dry an airflow into the tank 222. The air supply 546 may include one or more fans, air filters, conduits, or a combination thereof. The air dryer 548 may include a dehumidifier, a desiccant material, or a combination thereof. The air discharge system 544 may include a tank breather 550, which allows release of the air flow provided by the air intake system 542. Accordingly, the dry airflow from the air intake system 542 may absorb moisture inside the tank 222 to generate a moist airflow, which is then discharged through the tank breather 550.

The common HPU 18 described in detail above with reference to FIGS. 1-4 may be used to improve the operation of the steam turbine system 16. For example, the common HPU 18 may use a common hydraulic fluid (e.g., self-extinguishing, fire-resistant fluid) for both the main control system 132 and the bypass control system 134, wherein the properties are selected to meet the greater demands of each of the systems 132 and 134. The common HPU 18 also may improve one or more aspects of the startup, shutdown, and turbine trip processes of the steam turbine system 16.

Figure 5:
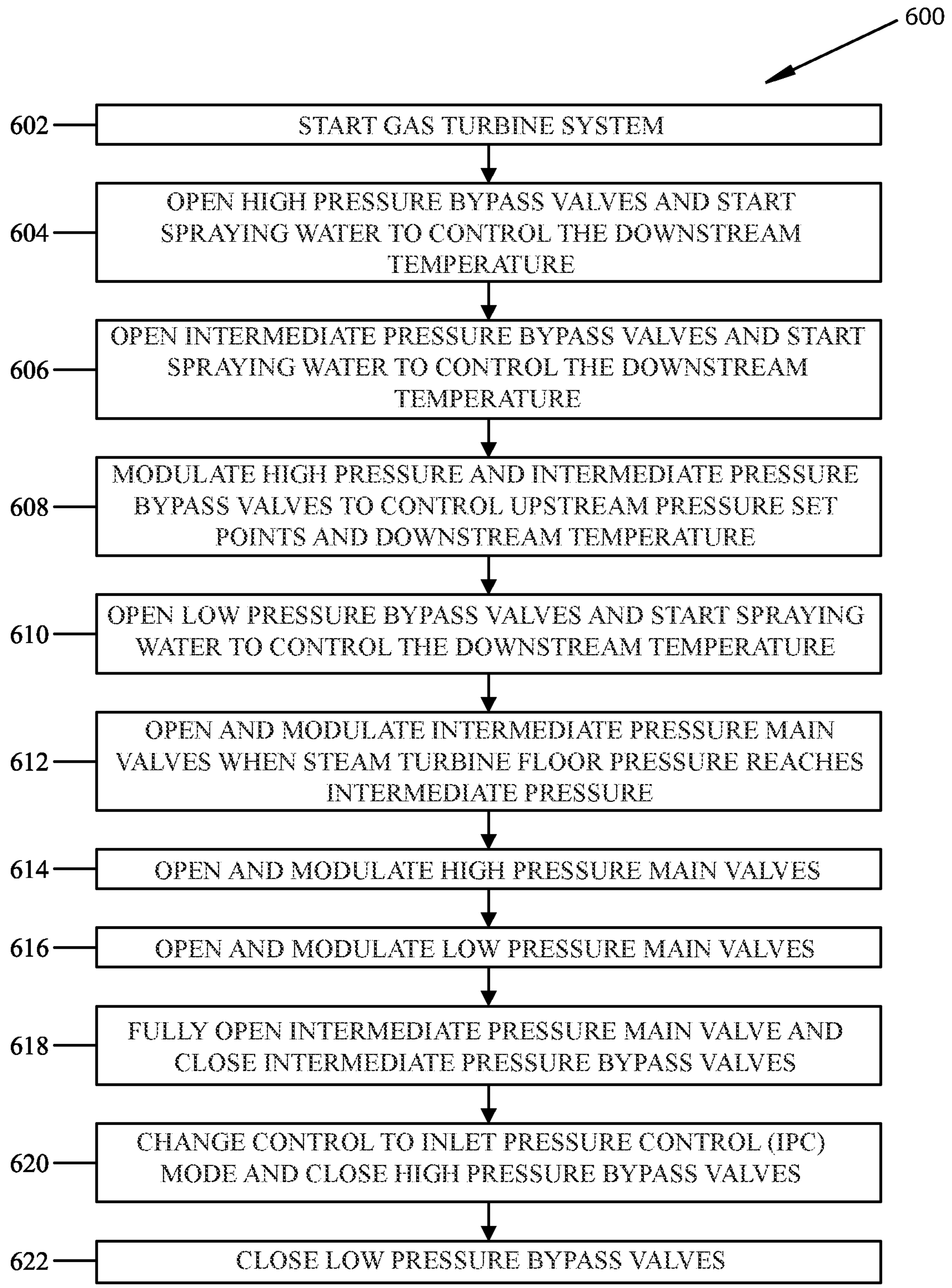
FIG. 5 is a flow chart of an embodiment of a startup process for the steam turbine system using the common HPU of FIGS. 1-4.

FIG. 5 is a flow chart of an embodiment of a startup process 600 for the steam turbine system 16 of the system 10. As illustrated in FIG. 5, the startup process 600 may include starting up the gas turbine system 12 (block 602) followed by various steps using the common HPU 18. For example, block 604 of the startup process 600 may include at least partially opening the high pressure bypass pressure control valve 154 (e.g., a minimum opening) to control upstream pressure and, based on a downstream temperature set point, opening the high pressure bypass spray water isolation valve 156 and the high pressure bypass spray water control valve 158 to start spraying water to control a downstream temperature, wherein hydraulic fluid from the common HPU 18 is used to facilitate opening of the high pressure valves 154, 156, 158. In block 606, the startup process 600 may further include opening the intermediate pressure bypass steam shutoff valve 180 (e.g., open to 100% open) and at least partially opening the intermediate pressure bypass pressure control valve 178 to control upstream pressure (e.g., a minimum opening) and, based on the downstream temperature set point, opening the intermediate pressure bypass spray water isolation valve 184 and the intermediate pressure bypass spray water control valve 182 to start spraying water to control the downstream temperature, wherein hydraulic fluid from the common HPU 18 is used to facilitate opening of the intermediate pressure valves 178, 180, 182, 184.

In block 608, the startup process 600 may include modulating the high pressure bypass pressure control valve 154 and the intermediate pressure bypass pressure control valve 178 to control upstream pressure set points, and modulating the high pressure bypass spray water control valve 158 and the intermediate pressure bypass spray water control valve 182 to control the downstream temperature, wherein hydraulic fluid from the common HPU 18 is used to facilitate opening of the valves. In block 610, the startup process 600 may further include opening the low pressure bypass steam shutoff valve 210 (e.g., open to 100% open) and at least partially opening the low pressure bypass pressure control valve 208 and, based on the downstream temperature set point, opening the low pressure bypass spray water isolation valve 214 and the low pressure bypass spray water control valve 212 to start spraying water to control the downstream temperature, wherein hydraulic fluid from the common HPU 18 is used to facilitate opening of the low pressure valves 208, 210, 212, 214.

In block 612, the startup process 600 may include opening and modulating the intermediate pressure main steam control valve 170 and the intermediate pressure main steam stop valve 172 when a steam turbine floor pressure reaches an intermediate pressure, wherein hydraulic fluid from the common HPU 18 is used to facilitate opening of the intermediate pressure valves 170, 172. In block 614, the startup process 600 may include opening and modulating the high pressure main steam control valve 146 and the high pressure main steam stop valve 148, wherein hydraulic fluid from the common HPU 18 is used to facilitate movements of the high pressure valves 146, 148. In block 616, the startup process 600 may include opening and modulating the low pressure main control and stop valves 200, 202, wherein hydraulic fluid from the common HPU 18 is used to facilitate opening of the low pressure valves 200, 202.

In block 618, the startup process 600 may include fully opening the intermediate pressure main steam control valve 170 upon reaching a maximum open set point and closing the intermediate pressure bypass pressure control valve 178, the intermediate pressure bypass spray water isolation valve 184, and the intermediate pressure bypass spray water control valve 182, wherein valve closing may be achieved with actuator springs configured to depressurize valve actuators of the valves. In block 620, the startup process 600 may include changing a high pressure turbine control to an inlet pressure control (IPC) mode when the high pressure bypass pressure control valve 154 reaches a minimum opening set point, and closing the high pressure bypass pressure control valve 154, the high pressure bypass spray water isolation valve 156, and the high pressure bypass spray water control valve 158, wherein valve closing may be achieved with actuator springs configured to depressurize valve actuators of the valves.

In block 622, the startup process 600 may include closing the low pressure bypass pressure control valve 208 upon reaching a minimum position, and closing the low pressure bypass spray water isolation valve 214 and the low pressure bypass spray water control valve 212, wherein valve closing may be achieved with actuator springs configured to depressurize valve actuators of the valves. In certain embodiments, in the foregoing startup process 600, the valve opening may be achieved by pressurizing valve actuators (e.g., actuator cylinders) for the valves using the common HPU 18, whereas valve closing may be achieved with actuator springs configured to depressurize the valve actuators (e.g., actuator cylinders) of the valves, or vice versa. The foregoing startup process 600 is one possible example for the system 10. However, the common HPU 18 may be used in a variety of ways to facilitate startup process 600.

Figure 6:
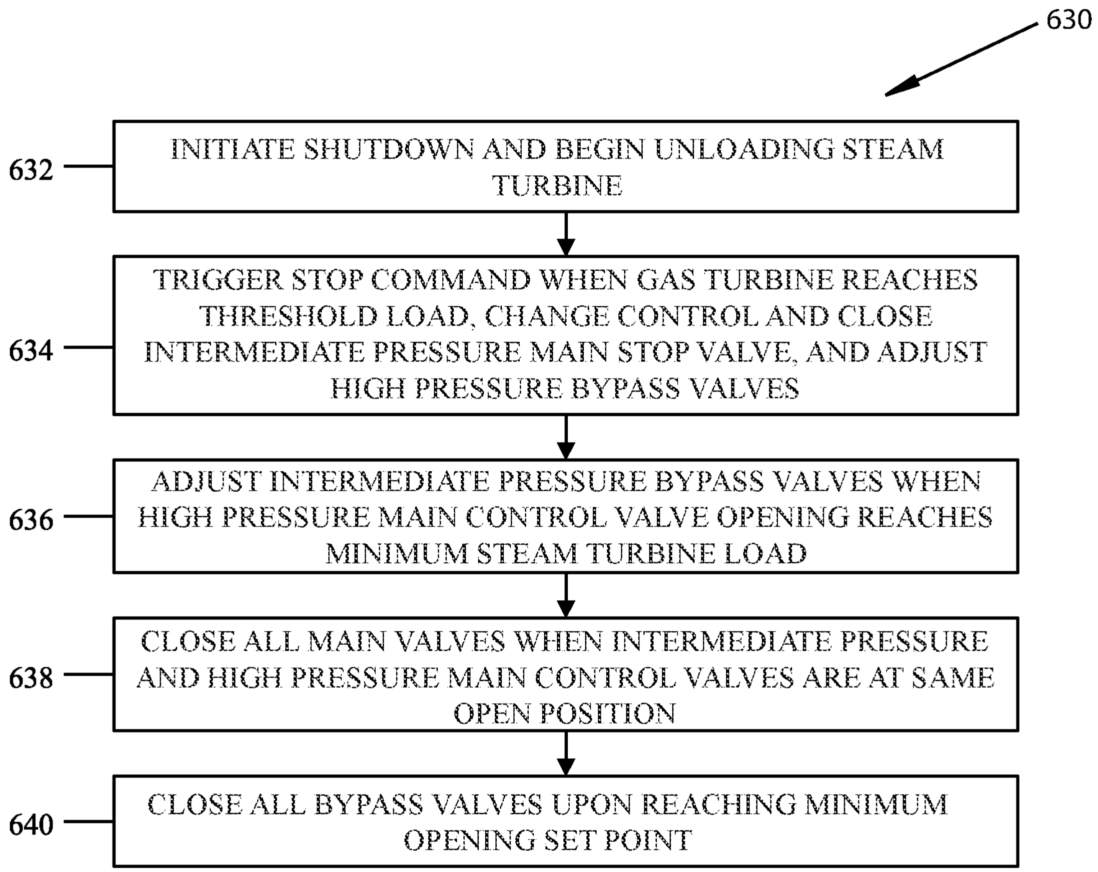
FIG. 6 is a flow chart of an embodiment of a shutdown process for the steam turbine system using the common HPU of FIGS. 1-4.

FIG. 6 is a flow chart of an embodiment of a shutdown process 630 for the steam turbine system 16 of the system 10. As illustrated in FIG. 6, the shutdown process 630 may include initiating a shutdown command and beginning to unload the steam turbine system 16 in proportion to steam flow decrease (block 632). In block 634, the shutdown process 630 may include triggering a stop command when the gas turbine system 12 reaches a threshold load (e.g., 40% load), changing control (e.g., stopping Inlet Pressure Control (IPC) mode) and closing the intermediate pressure main steam control valve 170, starting to modulate the high pressure bypass pressure control valve 154, opening the high pressure bypass spray water isolation valve 156, and starting to modulate the high pressure bypass spray water control valve 158. In block 636, the shutdown process 630 includes, when the high pressure main steam control valve 146 opening reaches a minimum steam turbine load, starting to close the intermediate pressure main steam control valve 170, starting to modulate the high pressure bypass pressure control valve 154, opening intermediate pressure bypass spray water isolation valve 184, and starting to modulate the intermediate pressure bypass spray water control valve 182. In block 638, the shutdown process 630 includes closing (e.g., simultaneously) all main valves (e.g., 146, 148, 170, 172, and 196) when the intermediate pressure main steam control valve 170 and the high pressure main steam control valve 146 are at the same open positions. In block 640, the shutdown process 630 includes closing all bypass valves (e.g., 154, 156, 158, 178, 180, 182, 184, 208, 210, 212, and 214) upon reaching a minimum opening set point. In certain embodiments, in the foregoing shutdown process 630, the valve opening may be achieved by pressurizing valve actuators (e.g., actuator cylinders) for the valves using the common HPU 18, whereas valve closing may be achieved with actuator springs configured to depressurize the valve actuators (e.g., actuator cylinders) of the valves, or vice versa.

Figure 7:
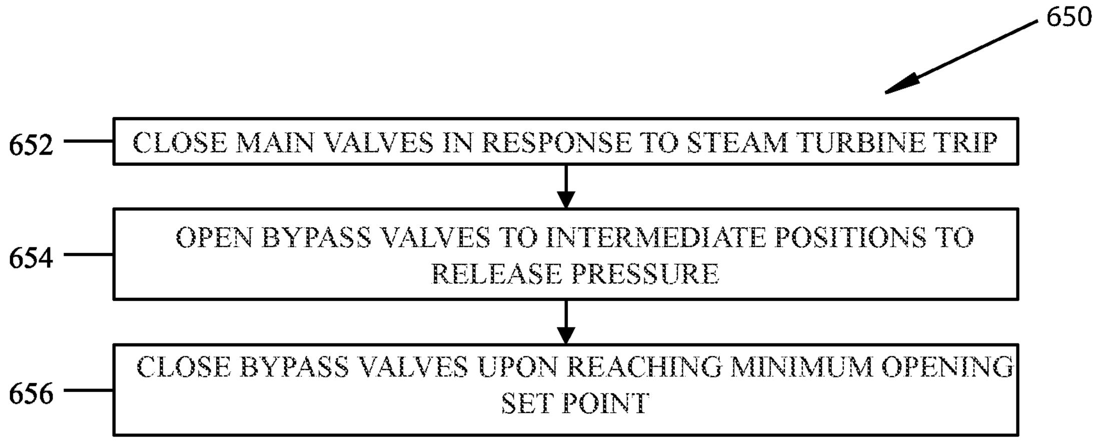
FIG. 7 is a flow chart of an embodiment of a steam turbine trip process for the steam turbine system using the common HPU of FIGS. 1-4.

FIG. 7 is a flow chart of an embodiment of a steam turbine trip process 650 for the steam turbine system 16 of the system 10. As illustrated in FIG. 7, the steam turbine trip process 650 may include closing (e.g., simultaneously) all main valves (e.g., 146, 148, 170, 172, and 196) in response to a stream turbine trip (block 652). In block 654, the steam turbine trip process 650 includes opening (e.g., simultaneously) all bypass valves (e.g., 154, 156, 158, 178, 180, 182, 184, 208, 210, 212, and 214) at intermediate calculated positions to release pressure and control outlet temperatures. In block 656, the steam turbine trip process 650 includes closing all bypass valves (e.g., 154, 156, 158, 178, 180, 182, 184, 208, 210, 212, and 214) upon reaching minimum opening set points. In certain embodiments, in the foregoing steam turbine trip process 650, the valve opening may be achieved by pressurizing valve actuators (e.g., actuator cylinders) for the valves using the common HPU 18, whereas valve closing may be achieved with actuator springs configured to depressurize the valve actuators (e.g., actuator cylinders) of the valves, or vice versa.

Technical effects of the disclosed embodiments include use of the common HPU 18 to control operation of both main valves (e.g., 142, 166, and 196) of the main control system 132 and bypass valves (e.g., 150, 174, and 204) of the bypass control system 134. The common HPU 18 provides the same benefits to both systems 132 and 134, while also reducing unnecessary redundancies, reducing the footprint of the overall system 10, and improving operation of the system 10. For example, the common HPU 18 may be configured based on the greater requirements of the two systems 132 and 134, such that the lesser requirements of the two systems 132 and 134 are substantially exceeded for improved reliability and performance. In certain embodiments, the common HPU 18 may operate with a single hydraulic fluid, such as a self-extinguishing, fire-resistant hydraulic fluid.

The subject matter described in detail above may be defined by one or more clauses, as set forth below.

In certain embodiments, a system includes a hydraulic power unit having a tank, a pump assembly, an accumulator assembly, and a header. The tank is configured to store a common hydraulic fluid. The pump assembly is configured to pump the common hydraulic fluid from the tank to provide a pressurized hydraulic fluid. The accumulator assembly is configured to store the pressurized hydraulic fluid. The header is coupled to the pump assembly and the accumulator assembly, wherein the header is configured to supply the pressurized hydraulic fluid to one or more main valves and one or more bypass valves of a steam turbine system.

The system of the preceding clause, wherein the common hydraulic fluid includes a self-extinguishing, fire-resistant hydraulic fluid.

The system of any preceding clause, wherein the self-extinguishing, fire-resistant hydraulic fluid includes a phosphate ester fluid, a synthetic non-aqueous triaryl phosphate ester fluid, trixylenyl phosphate, trixylenyl and t-butylphenyl phosphate, t-butylphenyl phosphate having 15-25% triphenyl phosphate, t-butylphenyl phosphate having less than 5% of triphenyl phosphate, or any combination thereof.

The system of any preceding clause, wherein the self-extinguishing, fire-resistant hydraulic fluid has an auto-ignition temperature of greater than 520 degrees Celsius.

The system of any preceding clause, wherein the hydraulic power unit is configured to pressurize the common hydraulic fluid to a pressure sufficient for operation of the one or more main valves and the one or more bypass valves.

The system of any preceding clause, wherein the pressure is at least 1500 psig.

The system of any preceding clause, wherein the hydraulic power unit includes a thermal system configured to control a temperature of the common hydraulic fluid.

The system of any preceding clause, wherein the hydraulic power unit includes a conditioning system having one or more filters and/or conditioning media configured to condition the common hydraulic fluid.

The system of any preceding clause, wherein the accumulator assembly includes a plurality of accumulators, and the accumulator assembly is configured to store a sufficient amount of the pressurized hydraulic fluid to operate the one or more main valves and the one or more bypass valves.

The system of any preceding clause, including a main control system and a bypass control system of the steam turbine system, wherein the main control system includes the one or more main valves, and the bypass control system includes the one or more bypass valves.

The system of any preceding clause, including a trip system coupled to the main control system, wherein the trip system includes one or more trip valves.

The system of any preceding clause, wherein the one or more main valves include high pressure main valves, intermediate pressure main valves, and low pressure main valves, wherein the one or more bypass valves include high pressure bypass valves, intermediate pressure bypass valves, and low pressure bypass valves.

The system of any preceding clause, including the steam turbine system having a high pressure turbine, an intermediate pressure turbine, and a low pressure turbine.

The system of any preceding clause, including the steam turbine system, a gas turbine system, and a heat recovery steam generator (HRSG) configured to generate steam for the steam turbine system from exhaust gas from the gas turbine system.

The system of any preceding clause, wherein the hydraulic power unit includes a monitoring system and a control system, wherein the monitoring system is configured to obtain feedback from one or more sensors in the hydraulic power unit, and the control system is configured to control the hydraulic power unit based at least in part on the feedback.

In certain embodiments, a system includes a steam turbine, a main control system, a bypass control system, and a hydraulic power unit coupled to the main control system and the bypass control system. The main control system has one or more main valves coupled to the steam turbine. The bypass control system has one or more bypass valves coupled to the steam turbine. The hydraulic power unit is configured to supply a common hydraulic fluid at a pressure sufficient to operate the one or more main valves and the one or more bypass valves.

The system of the preceding clause, wherein the common hydraulic fluid includes a self-extinguishing, fire-resistant hydraulic fluid.

The system of the preceding clause, wherein the self-extinguishing, fire-resistant hydraulic fluid includes a phosphate ester fluid having an auto-ignition temperature of at least 520 degrees Celsius, wherein the pressure is at least 1500 psig.

The system of any preceding clause, wherein the hydraulic power unit includes a tank, a pump assembly, an accumulator assembly, and a header coupled to the pump assembly and the accumulator assembly. The tank is configured to store the common hydraulic fluid. The pump assembly is configured to pump the common hydraulic fluid from the tank to provide a pressurized hydraulic fluid. The accumulator assembly is configured to store the pressurized hydraulic fluid. The header is configured to supply the pressurized hydraulic fluid to the one or more main valves and the one or more bypass valves of the steam turbine.

In certain embodiments, a method includes storing a common hydraulic fluid in a tank of a hydraulic power unit, pumping the common hydraulic fluid from the tank via a pump assembly of the hydraulic power unit to provide a pressurized hydraulic fluid, and storing the pressurized hydraulic fluid via an accumulator assembly of the hydraulic power unit. The method also includes supplying the pressurized hydraulic fluid to one or more main valves and one or more bypass valves of a steam turbine system via a header of the hydraulic power unit, wherein the header is coupled to the pump assembly and the accumulator assembly.

This written description uses examples to disclose the subject technology, including the best mode, and also to enable any person skilled in the art to practice the invention, including making and using any devices or systems and performing any incorporated methods. The patentable scope of the subject technology is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
- a hydraulic power unit, comprising:
  - a tank configured to store a hydraulic fluid;
  - a pump assembly configured to pump the hydraulic fluid from the tank to provide a pressurized hydraulic fluid;
  - an accumulator assembly configured to store the pressurized hydraulic fluid;
  - a main control system comprising one or more first hydraulic actuators coupled to one or more main valves;
  - a bypass control system comprising one or more second hydraulic actuators coupled to one or more bypass valves;
  - a trip system having one or more trip valves configured to control a supply of the pressurized hydraulic fluid in response to a turbine trip event of a steam turbine system, wherein the turbine trip event comprises a pressure drop in the pressurized hydraulic fluid below a pressure threshold; and
  - a header coupled to the pump assembly and the accumulator assembly, wherein the header is configured to supply the pressurized hydraulic fluid to the one or more first hydraulic actuators coupled to the one or more main valves and the one or more second hydraulic actuators coupled to the one or more bypass valves of the steam turbine system; and
- a controller coupled to the hydraulic power unit, wherein the controller comprises a processor, a memory, and instructions stored on the memory and executable by the processor to control the hydraulic power unit to:
  - control the supply of the pressurized hydraulic fluid to at least meet or exceed first specifications of the one or more first hydraulic actuators of the one or more main valves and second specifications of the one or more second hydraulic actuators of the one or more bypass valves, wherein the first and second specifications are different from one another;
  - control the supply of the pressurized hydraulic fluid to the one or more first hydraulic actuators to actuate the one or more main valves to control a steam supply to flow through one or more steam turbines of the steam turbine system; and
  - control the supply of the pressurized hydraulic fluid to the one or more second hydraulic actuators to actuate the one or more bypass valves to control a bypass of the steam supply to not flow through the one or more steam turbines of the steam turbine system.

2. The system of claim 1, wherein the hydraulic fluid comprises a self-extinguishing, fire-resistant hydraulic fluid.

3. The system of claim 2, wherein the self-extinguishing, fire-resistant hydraulic fluid comprises a phosphate ester fluid, a synthetic non-aqueous triaryl phosphate ester fluid, trixylenyl phosphate, trixylenyl and t-butylphenyl phosphate, t-butylphenyl phosphate having 15-25% triphenyl phosphate, t-butylphenyl phosphate having less than 5% of triphenyl phosphate, or any combination thereof.

4. The system of claim 2, wherein the self-extinguishing, fire-resistant hydraulic fluid has an auto-ignition temperature of at least 520 degrees Celsius.

5. The system of claim 1, wherein the controller is configured to control the hydraulic power unit to pressurize the hydraulic fluid to a pressure sufficient for operation of the one or more first hydraulic actuators coupled to the one or more main valves and the one or more second hydraulic actuators coupled to the one or more bypass valves, wherein the pressure is at least 1500 psig.

6. The system of claim 1, wherein the hydraulic power unit is a single hydraulic power unit comprising the tank, the pump assembly, the accumulator assembly, the header, and the hydraulic fluid between all of the one or more first hydraulic actuators of the one or more main valves and all of the one or more second hydraulic actuators of the one or more bypass valves; wherein the hydraulic fluid comprises a self-extinguishing, fire-resistant hydraulic fluid; and wherein the system excludes separate hydraulic power units dedicated only to the one or more main valves or only to the one or more bypass valves.

7. The system of claim 1, wherein the hydraulic power unit comprises one or more heat exchangers, heaters, or coolers configured to control a temperature of the hydraulic fluid.

8. The system of claim 1, wherein the hydraulic power unit comprises a conditioning system having one or more filters and conditioning media configured to condition the hydraulic fluid, and the conditioning media comprises an ion exchange type acid control media.

9. The system of claim 1, wherein the accumulator assembly comprises a plurality of accumulators, and the accumulator assembly is configured to store a sufficient amount of the pressurized hydraulic fluid to operate the one or more first hydraulic actuators to actuate the one or more main valves and the one or more second hydraulic actuators to actuate the one or more bypass valves.

10. The system of claim 1, wherein the one or more trip valves are configured to permit the supply of the pressurized hydraulic fluid to the one or more first hydraulic actuators of the one or more main valves during a normal operating control mode, and the one or more trip valves are configured to depressurize the supply of the pressurized hydraulic fluid to the one or more first hydraulic actuators of the one or more main valves during the turbine trip event to cause the one or more main valves to move to a safe position.

11. The system of claim 1, comprising the one or more main valves and the one or more bypass valves, wherein the one or more main valves comprise high pressure main valves along a high pressure steam line, intermediate pressure main valves along an intermediate pressure steam line, and low pressure main valves along a low pressure steam line, wherein the one or more bypass valves comprise high pressure bypass valves along a high pressure bypass line coupled to the high pressure steam line, intermediate pressure bypass valves along an intermediate pressure bypass line coupled to the intermediate pressure steam line, and low pressure bypass valves along a low pressure bypass line coupled to the low pressure steam line.

12. The system of claim 11, comprising the steam turbine system having the one or more steam turbines comprising a high pressure turbine coupled to the high pressure steam line, an intermediate pressure turbine coupled to the intermediate pressure steam line, and a low pressure turbine coupled to the low pressure steam line.

13. The system of claim 12, wherein:

the high pressure main valves comprise a high pressure main steam control valve and a high pressure main steam stop valve, and wherein the high pressure bypass valves comprise a high pressure bypass pressure control valve, a high pressure bypass spray water isolation valve, and a high pressure bypass spray water control valve;

the intermediate pressure main valves comprise an intermediate pressure main steam control valve and an intermediate pressure main steam stop valve, and wherein the intermediate pressure bypass valves comprise an intermediate pressure bypass pressure control valve, an intermediate pressure bypass steam shutoff valve, and an intermediate pressure bypass spray water control valve; and the low pressure main valves comprise a low pressure main steam control valve and a low pressure main steam stop valve, and wherein the low pressure bypass valves comprise a low pressure bypass pressure control valve, a low pressure bypass steam shutoff valve, a low pressure bypass spray water control valve, and a low pressure bypass spray water isolation valve.

14. The system of claim 1, comprising the steam turbine system, a gas turbine system, and a heat recovery steam generator (HRSG) configured to generate steam for the steam turbine system from exhaust gas from the gas turbine system, wherein the one or more main valves are coupled to one or more steam supply lines from the HRSG to the one or more steam turbines of the steam turbine system.

15. The system of claim 1, wherein the header comprises first, second, and third pressure sensors configured to monitor a pressure of the pressurized hydraulic fluid, and the controller is configured to trigger the turbine trip event when at least two of the first, second, and third pressure sensors indicate the pressure is below the pressure threshold.

16. The system of claim 1, wherein, in response to the turbine trip event, the controller is configured to:

control the supply of the pressurized hydraulic fluid from the hydraulic power unit to the one or more first hydraulic actuators to close the one or more main valves;

control the supply of the pressurized hydraulic fluid from the hydraulic power unit to the one or more second hydraulic actuators to move the one or more bypass valves to intermediate positions to release pressure; and control the supply of the pressurized hydraulic fluid from the hydraulic power unit to the one or more second hydraulic actuators to close the one or more bypass valves upon reaching a setpoint after the release of pressure.

17. A system, comprising:

a steam turbine system having one or more steam turbines;

a main control system having one or more first hydraulic actuators coupled to one or more main valves, wherein the one or more main valves are coupled to the steam turbine system to control a steam supply to flow through the one or more steam turbines;

a bypass control system having one or more second hydraulic actuators coupled to one or more bypass valves, wherein the one or more bypass valves are coupled to the steam turbine system to control a bypass of the steam supply to not flow through the one or more steam turbines; and a hydraulic power unit coupled to the main control system and the bypass control system, wherein the hydraulic power unit comprises at least one of a tank, a pump assembly, an accumulator assembly, a header, or a combination thereof, wherein the hydraulic power unit supplies a common hydraulic fluid as a pressurized hydraulic fluid at a pressure sufficient to operate the one or more first hydraulic actuators to actuate the one or more main valves and the one or more second hydraulic actuators to actuate the one or more bypass valves, wherein the pressure at least meets or exceeds first specifications of the one or more first hydraulic actuators of the one or more main valves and second specifications of the one or more second hydraulic actuators of the one or more bypass valves, wherein the first and second specifications are different from one another; and a trip system having one or more trip valves configured to control a supply of the pressurized hydraulic fluid in response to a turbine trip event of the steam turbine system, wherein the turbine trip event comprises a pressure drop in the pressurized hydraulic fluid below a pressure threshold.

18. The system of claim 17, comprising a controller coupled to the hydraulic power unit, wherein the controller comprises a processor, a memory, and instructions stored on the memory and executable by the processor to control the hydraulic power unit to:

control the supply of the common hydraulic fluid to at least meet or exceed the first specifications and the second specifications;

control the supply of the common hydraulic fluid to the one or more first hydraulic actuators to actuate the one or more main valves to control the steam supply to flow through the one or more steam turbines; and control the supply of the common hydraulic fluid to the one or more second hydraulic actuators to actuate the one or more bypass valves to control the bypass of the steam supply to not flow through the one or more steam turbines.

19. The system of claim 17, wherein the common hydraulic fluid comprises a self-extinguishing, fire-resistant hydraulic fluid, wherein the self-extinguishing, fire-resistant hydraulic fluid comprises a phosphate ester fluid having an auto-ignition temperature of at least 520 degrees Celsius, wherein the pressure is at least 1500 psig.

20. The system of claim 17, wherein the hydraulic power unit comprises each of:

the tank configured to store the common hydraulic fluid, wherein the common hydraulic fluid comprises a self-extinguishing, fire-resistant hydraulic fluid;

the pump assembly configured to pump the common hydraulic fluid from the tank to provide the pressurized hydraulic fluid;

the accumulator assembly configured to store the pressurized hydraulic fluid; and the header coupled to the pump assembly and the accumulator assembly, wherein the header is configured to supply the pressurized hydraulic fluid to the one or more first hydraulic actuators coupled to the one or more main valves and the one or more second hydraulic actuators coupled to the one or more bypass valves of the one or more steam turbines.

21. A method, comprising:

storing a common hydraulic fluid in a tank of a hydraulic power unit;

pumping the common hydraulic fluid from the tank via a pump assembly of the hydraulic power unit to provide a pressurized hydraulic fluid;

storing the pressurized hydraulic fluid via an accumulator assembly of the hydraulic power unit; and controlling a supply of the pressurized hydraulic fluid to one or more first hydraulic actuators coupled to one or more main valves of a main control system and one or more second hydraulic actuators coupled to one or more bypass valves of a bypass control system of a steam turbine system via a header of the hydraulic power unit, wherein the header is coupled to the pump assembly and the accumulator assembly, wherein controlling the supply comprises:

controlling the supply of the pressurized hydraulic fluid to at least meet or exceed first specifications of the one or more first hydraulic actuators of the one or more main valves and second specifications of the one or more second hydraulic actuators of the one or more bypass valves, wherein the first and second specifications are different from one another;

controlling the supply of the pressurized hydraulic fluid to the one or more first hydraulic actuators to actuate the one or more main valves of the main control system to control a steam supply to flow through one or more steam turbines of the steam turbine system;

controlling the supply of the pressurized hydraulic fluid to the one or more second hydraulic actuators to actuate the one or more bypass valves of the bypass control system to control a bypass of the steam supply to not flow through the one or more steam turbines of the steam turbine system; and controlling the supply of the pressurized hydraulic fluid via a trip system having one or more trip valves in response to a turbine trip event of the steam turbine system, wherein the turbine trip event comprises a pressure drop in the pressurized hydraulic fluid below a pressure threshold.

22. A system, comprising:

a steam turbine system having one or more steam turbines comprising a high pressure turbine coupled to a high pressure steam line, an intermediate pressure turbine coupled to an intermediate pressure steam line, and a low pressure turbine coupled to a low pressure steam line;

one or more main valves, wherein the one or more main valves comprise:

high pressure main valves along the high pressure steam line, wherein the high pressure main valves comprise a high pressure main steam control valve and a high pressure main steam stop valve;

intermediate pressure main valves along the intermediate pressure steam line, wherein the intermediate pressure main valves comprise an intermediate pressure main steam control valve and an intermediate pressure main steam stop valve; and low pressure main valves along the low pressure steam line, wherein the low pressure main valves comprise a low pressure main steam control valve and a low pressure main steam stop valve;

one or more bypass valves, wherein the one or more bypass valves comprise:

high pressure bypass valves along a high pressure bypass line coupled to the high pressure steam line, wherein the high pressure bypass valves comprise a high pressure bypass pressure control valve, a high pressure bypass spray water isolation valve, and a high pressure bypass spray water control valve;

intermediate pressure bypass valves along an intermediate pressure bypass line coupled to the intermediate pressure steam line, wherein the intermediate pressure bypass valves comprise an intermediate pressure bypass pressure control valve, an intermediate pressure bypass steam shutoff valve, and an intermediate pressure bypass spray water control valve; and low pressure bypass valves along a low pressure bypass line coupled to the low pressure steam line, wherein the low pressure bypass valves comprise a low pressure bypass pressure control valve, a low pressure bypass steam shutoff valve, a low pressure bypass spray water control valve, and a low pressure bypass spray water isolation valve;

a hydraulic power unit, comprising:

a tank configured to store a hydraulic fluid;

a pump assembly configured to pump the hydraulic fluid from the tank to provide a pressurized hydraulic fluid;

an accumulator assembly configured to store the pressurized hydraulic fluid; and a header coupled to the pump assembly and the accumulator assembly, wherein the header is configured to supply the pressurized hydraulic fluid to one or more first hydraulic actuators coupled to the one or more main valves and one or more second hydraulic actuators coupled to the one or more bypass valves of the steam turbine system; and a controller coupled to the hydraulic power unit, wherein the controller comprises a processor, a memory, and instructions stored on the memory and executable by the processor to control the hydraulic power unit to:

control the supply of the pressurized hydraulic fluid to at least meet or exceed first specifications of the one or more first hydraulic actuators of the one or more main valves and second specifications of the one or more second hydraulic actuators of the one or more bypass valves, wherein the first and second specifications are different from one another;

control the supply of the pressurized hydraulic fluid to the one or more first hydraulic actuators to actuate the one or more main valves to control a steam supply to flow through the one or more steam turbines of the steam turbine system; and control the supply of the pressurized hydraulic fluid to the one or more second hydraulic actuators to actuate the one or more bypass valves to control a bypass of the steam supply to not flow through the one or more steam turbines of the steam turbine system.

* * * * *